(12) United States Patent
Siddiqui et al.

(10) Patent No.: US 11,192,804 B2
(45) Date of Patent: Dec. 7, 2021

(54) METHOD OF ADSORBING CONTAMINANTS USING A POROUS CARBON COMPOUND

(71) Applicant: King Fahd University of Petroleum and Minerals, Dhahran (SA)

(72) Inventors: Mohammad Nahid Siddiqui, Dhahran (SA); Basheer Chanbasha, Dhahran (SA); Faisal Mohammed Al-Issa, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 210 days.

(21) Appl. No.: 16/688,596

(22) Filed: Nov. 19, 2019

(65) Prior Publication Data

US 2021/0147258 A1    May 20, 2021

(51) Int. Cl.
| | |
|---|---|
| *C02F 1/28* | (2006.01) |
| *B01J 20/20* | (2006.01) |
| *B01J 20/28* | (2006.01) |
| *B01J 20/34* | (2006.01) |
| *B01J 20/30* | (2006.01) |
| *C02F 101/32* | (2006.01) |

(52) U.S. Cl.
CPC ............ *C02F 1/283* (2013.01); *B01J 20/205* (2013.01); *B01J 20/28066* (2013.01); *B01J 20/28076* (2013.01); *B01J 20/3078* (2013.01); *B01J 20/3416* (2013.01); *B01J 20/3475* (2013.01); *C02F 2101/327* (2013.01); *C02F 2303/16* (2013.01); *C02F 2305/08* (2013.01)

(58) Field of Classification Search
None
See application file for complete search history.

(56) References Cited

U.S. PATENT DOCUMENTS

| | | | | |
|---|---|---|---|---|
| 7,550,074 | B2 * | 6/2009 | Clark | ................ C10G 25/003 |
| | | | | 208/307 |
| 9,146,228 | B2 * | 9/2015 | Nuhu | ................ G01N 33/50 |
| 9,296,626 | B2 * | 3/2016 | Choo | ................ B01J 20/3204 |
| (Continued) | | | | |

FOREIGN PATENT DOCUMENTS

| | | |
|---|---|---|
| CN | 107240681 A | 10/2017 |
| CN | 109292750 A | 2/2019 |
| CN | 109473647 A | 3/2019 |

OTHER PUBLICATIONS

H. Curl, et al., "Chemical and Physical Properties of Refined Petroleum Products," NOAA Technical Memorandum ERL MESA-17 (Environmental Research Laboratories, Marine Ecosystems Analysis Program), Oct. 1977, downloaded from file:///C:/Users/cbarry/Downloads/noaa_11031_DS1.pdf on Aug. 12, 2021. (Year: 1977).*

(Continued)

*Primary Examiner* — Chester T Barry
(74) *Attorney, Agent, or Firm* — Oblon, McClelland, Maier & Neustadt, L.L.P.

(57) ABSTRACT

A method of using a nanoporous carbon material for adsorption of one or more PAH and diesel fuel from an aqueous solution is described. The aqueous solution may comprise the one or more PAH at a concentration of 0.1 mg/L-1 g/L, and the diesel fuel at a concentration of 0.1-5 g/L. The nanoporous carbon material may adsorb at least 96 wt % of one or more PAH within 10 minutes. The nanoporous carbon material may be obtained by contacting a carbonized asphalt with a base.

19 Claims, 10 Drawing Sheets

(56) References Cited

U.S. PATENT DOCUMENTS

| | | | |
|---|---|---|---|
| 9,776,165 B2 | 10/2017 | Tour et al. | |
| 10,005,715 B2 | 6/2018 | Siddiqui | |
| 2007/0184976 A1* | 8/2007 | Zhang | C10G 25/003 |
| | | | 502/417 |
| 2009/0152194 A1* | 6/2009 | Borg | C12N 1/26 |
| | | | 210/610 |
| 2010/0200515 A1* | 8/2010 | Saien | C02F 1/325 |
| | | | 210/742 |
| 2014/0374320 A1* | 12/2014 | Lin | C10G 25/02 |
| | | | 208/250 |
| 2019/0070533 A1* | 3/2019 | Cheng | C02F 9/005 |
| 2020/0030727 A1* | 1/2020 | Spelter | B01J 20/12 |

OTHER PUBLICATIONS

Ania et al. "Removal of naphthalene from aqueous solution onchemically modified activated carbons", Water Research41 (2007) 333-340 (Year: 2007).*

Yuan, et al. ; Adsorption of polycyclic aromatic hydrocarbons from water using petroleum coke-derived porous carbon ; Journal of Hazardous Materials 181 ; pp. 1115-1120 ; Jun. 4, 2010 ; 6 Pages.

Jalilov, et al. ; Asphalt-Derived High Surface Area Activated Porous Carbons for Carbon Dioxide Capture ; ACS Applied Materials and Interfaces ; 7 Pages.

He, et al. ; Porous carbon nanosheets from coal tar for high-performance supercapacitors ; Journal of Power Sources, vol. 357 ; pp. 41-46 ; Jul. 31, 2017 ; Abstract Only ; 2 Pages.

Jalivov, et al. ; Ultra-High Surface Area Activated Porous Asphalt for CO2 Capture through Competitive Adsorption at High Pressures ; Advanced Energy Materials ; 2016 ; 7 Pages.

* cited by examiner

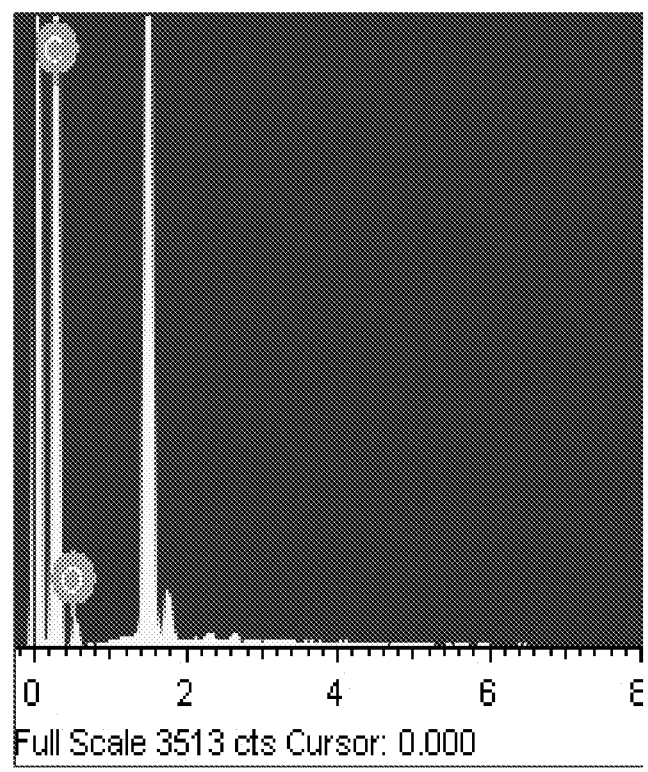
FIG. 2A
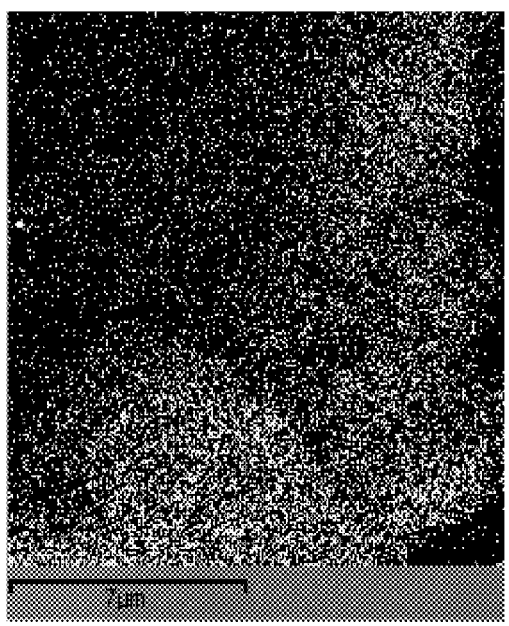     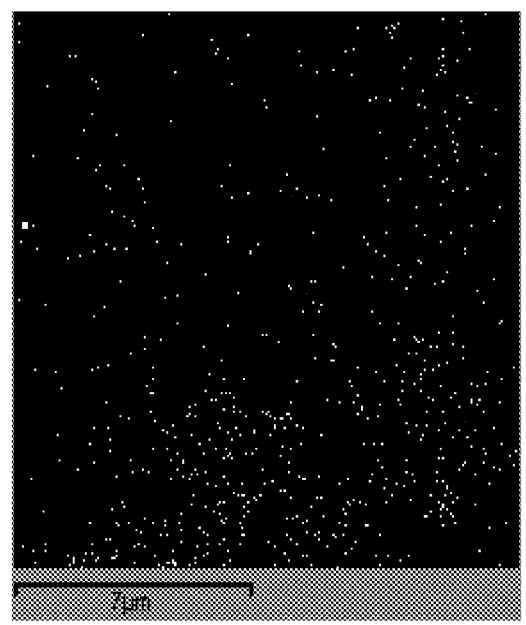
FIG. 2B               FIG. 2C

METHOD OF ADSORBING CONTAMINANTS USING A POROUS CARBON COMPOUND

STATEMENT OF ACKNOWLEDGEMENT

This project was prepared through support provided by the Deanship of Scientific Research (DSR) at King Fand University of Petroleum & Minerals (KFUPM), Dhahran, Saudi Arabia, project number IN171031.

BACKGROUND OF THE INVENTION

Technical Field

The present invention relates to a method of using a nanoporous carbon material to adsorb contaminants from an aqueous solution.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

There is a global concern on the widespread distribution and increase in the concentration of Polycyclic Aromatic Hydrocarbons (PAHs) in the environment. See Srivastava, P., Sreekrishnan, T. R. & Nema, A. K. Polyaromatic Hydrocarbons: Review of a Global Environmental Issue. *J. Hazardous, Toxic, Radioact. Waste* 22, 04018004 (2018), incorporated herein by reference in its entirety. PAHs are organic molecules consisting of two or more fused aromatic rings PAHs are ubiquitous and have been reported in water, food, sediments, soil, dust, atmosphere, and petroleum products. See Srogi, K. Monitoring of environmental exposure to polycyclic aromatic hydrocarbons: A review. *Environ. Chem. Lett.* 5, 169-195 (2007); Chen, S. J. et al. Distribution and mass inventories of polycyclic aromatic hydrocarbons and organochlorine pesticides in sediments of the pearl river estuary and the northern South China Sea. *Environ. Sci. Technol.* 40, 709-714 (2006); Ranjbar Jafarabadi, A. et al. Distributions and compositional patterns of polycyclic aromatic hydrocarbons (PAHs) and their derivatives in three edible fishes from Kharg coral Island, Persian Gulf, Iran. *Chemosphere* 835-845 (2019). doi:10.1016/j.chemosphere.2018.10.092; Iwegbue, C. M. A. et al. Evaluation of Human Exposure to Polycyclic Aromatic Hydrocarbons from Some Edible Oils and Shea Butter in Nigeria. *Polycycl. Aromat. Compd.* 0, 1-15 (2019); Sosa, D. et al. Polycyclic aromatic hydrocarbons and polychlorinated biphenyls in urban and semi-urban soils of Havana, Cuba. *J. Soils Sediments* 19, 1328-1341 (2019); Liu, J. et al. Polycyclic Aromatic Hydrocarbons (PAHs) in Urban Street Dust of Huanggang, Central China: Status, Sources and Human Health Risk Assessment. *Aerosol Air Qual. Res.* 19, 221-233 (2018); and Ncube, S., Madikizela, L., Cukrowska, E. & Chimuka, L. Recent advances in the adsorbents for isolation of polycyclic aromatic hydrocarbons (PAHs) from environmental sample solutions. *TrAC-Trends in Analytical Chemistry* 99, 101-116 (2018), each incorporated herein by reference in their entirety.

PAHs enter the environment due to anthropogenic activities including incomplete combustion of organic compounds such as petroleum and coal, the discharge of industrial wastewater. See Abdel-Shafy, H. I. & Mansour, M. S. M. A review on polycyclic aromatic hydrocarbons: Source, environmental impact, effect on human health and remediation. *Egyptian Journal of Petroleum* 25, 107-123 (2016); Zhang, X. et al. The fate and enhanced removal of polycyclic aromatic hydrocarbons in wastewater and sludge treatment system: A review. *Crit. Rev. Environ. Sci. Technol.* 3389, (2019); Huang, Y. et al. Reduced Graphene Oxide-Hybridized Polymeric High-Internal Phase Emulsions for Highly Efficient Removal of Polycyclic Aromatic Hydrocarbons from Water Matrix. *Langmuir* 34, 3661-3668 (2018); and Eeshwarasinghe, D. et al. Removing polycyclic aromatic hydrocarbons from water using granular activated carbon: kinetic and equilibrium adsorption studies. *Environ. Sci. Pollut. Res.* 25, 13511-13524 (2018), each incorporated herein by reference in their entirety. Once in the environment, PAHs are chemically stable and could persist for a long duration. The determination of PAHs in the environment is often complicated because of their low solubility and concentration levels, especially in aqueous media. PAHs are toxic and can interfere with enzymatic systems and cellular membrane in the body of living organisms. In humans, they can either be genotoxic; altering genes that regulate cell growth and hence initiate cancer or promote the growth of cancerous cells. See Baird, W. M., Hooven, L. A. & Mahadevan, B. Carcinogenic polycyclic aromatic hydrocarbon-DNA adducts and mechanism of action. *Environ. Mol. Mutagen.* 45, 106-114 (2005); Rengarajan, T. et al. Exposure to polycyclic aromatic hydrocarbons with special focus on cancer. *Asian Pac. J. Trop. Biomed.* 5, 182-189 (2015); and Oranuba, E., Deng, H., Peng, J., Dawsey, S. M. & Kamangar, F. Polycyclic aromatic hydrocarbons as a potential source of carcinogenicity of mate. *J. Environ. Sci. Heal. Part C* 0, 1-16 (2018), each incorporated herein by reference in their entirety.

PAHs have also been reported to affect marine organisms. See Karacik, B., Okay, O. S., Henkelmann, B., Bernhöft, S. & Schramm, K. W. Polycyclic aromatic hydrocarbons and effects on marine organisms in the Istanbul Strait. *Environ. Int.* 35, 599-606 (2009), incorporated herein by reference in its entirety.

Additionally, diesel emission to the atmosphere is a primary source of air pollution, leading to lung diseases and other complicated health illness. See Xue, J., Hu, S., Quiros, D., Ayala, A., Jung, H. S. How do particle number, surface area, and mass correlate with toxicity of diesel particle emissions as measured in chemical and cellular assays? *Chemosphere*, 229, 559-569 (2019), incorporated herein by reference in its entirety. The primary source of diesel entry in aquatic sources is through vehicle emission, mechanical workshops, as a by-product of petroleum industries (produced water), and storm water runoff discharge. See Kontses, A., Dimaratos, A., Keramidas, C., Williams, R., Hamje, H., Ntziachristos, L., Samaras, Z. Effects of fuel properties on particulate emissions of diesel cars equipped with diesel particulate filters. *Fuel*, 255, 115879-(2019), incorporated herein by reference in its entirety. Composition of these contaminated oily waters often comprises a variety of hydrocarbons of different lengths and includes medium-chain aliphatic hydrocarbon compounds. Due to their adverse environmental impact, appropriate water treatment techniques that can afford the cleanup of PAHs and diesel containing oily waters are of great importance.

Adsorption is one such water treatment technique that has been widely used for various reasons. It is a direct and efficient approach and with a wide range of adsorbents based on different surface areas and other properties. See Lamichhane, S., Bal Krishna, K. C. & Sarukkalige, R. Polycyclic aromatic hydrocarbons (PAHs) removal by sorption: A review. *Chemosphere* 148, 336-353 (2016), incorporated herein by reference in its entirety. Research has been conducted on using different adsorbents to remove PAHs from solutions. See Ncube, S., Madikizela, L., Cukrowska, E. & Chimuka, L. Recent advances in the adsorbents for isolation of polycyclic aromatic hydrocarbons (PAHs) from environmental sample solutions. *TrAC Trends Anal. Chem.* 99, 101-116 (2018), incorporated herein by reference in its entirety. Biosorbents obtained from plant residues, adsorbents derived from minerals, butyl rubber, mesoporous organosilica, polymer composites, imprinted polymers, and carbonaceous materials have been used as adsorbents in the removal of various PAHs from water. See Chen, B., Yuan, M. & Liu, H. Removal of polycyclic aromatic hydrocarbons from aqueous solution using plant residue materials as a biosorbent. *J. Hazard. Mater.* 188, 436-442 (2011); Bruna, F., Celis, R., Real, M. & Cornejo, J. Organo/LDH nanocomposite as an adsorbent of polycyclic aromatic hydrocarbons in water and soil-water systems. *J. Hazard. Mater.* 225-226, 74-80 (2012); Ceylan, D. et al. Evaluation of Butyl Rubber as Sorbent Material for the Removal of Oil and Polycyclic Aromatic Hydrocarbons from Seawater. *Environ. Sci. Technol.* 43, 3846-3852 (2009); Vidal, C. B. et al. Adsorption of polycyclic aromatic hydrocarbons from aqueous solutions by modified periodic mesoporous organosilica. *J. Colloid Interface Sci.* 357, 466-473 (2011); Luo, Y.-B., Cheng, J.-S., Ma, Q., Feng, Y.-Q. & Li, J.-H. Graphene-polymer composite: extraction of polycyclic aromatic hydrocarbons from water samples by stir rod sorptive extraction. *Anal. Methods* 3, 92-98 (2011); Ho, W.-L., Liu, Y.-Y. & Lin, T.-C. Development of Molecular Imprinted Polymer for Selective Adsorption of Benz[a]pyrene Among Airborne Polycyclic Aromatic Hydrocarbon Compounds. *Environ. Eng. Sci.* 28, 421-434 (2011); and Yang, K., Zhu, L. & Xing, B. Adsorption of polycyclic aromatic hydrocarbons by carbon nanomaterials. *Environ. Sci. Technol.* 40, 1855-1861 (2006), each incorporated herein by reference in their entirety.

Activated carbon (AC) adsorbents offer a large external surface area, dynamic mesopores, and can be produced from various feedstocks. See Zhang, S., Shao, T., Kose, H. S. & Karanfil, T. Adsorption of Aromatic Compounds by Carbonaceous Adsorbents: A Comparative Study on Granular Activated Carbon, Activated Carbon Fiber, and Carbon Nanotubes. *Environ. Sci. Technol.* 44, 6377-6383 (2010), incorporated herein by reference in its entirety. ACs have been synthesized from different feedstock and successfully used in the adsorptive removal of various PAHs. See Yuan, M., Tong, S., Zhao, S. & Jia, C. Q. Adsorption of polycyclic aromatic hydrocarbons from water using petroleum coke-derived porous carbon. *J. Hazard. Mater.* 181, 1115-1120 (2010); Qiao, K. et al. Preparation of biochar from Enteromorpha prolifera and its use for the removal of polycyclic aromatic hydrocarbons (PAHs) from aqueous solution. *Ecotoxicol. Environ. Saf.* 149, 80-87 (2018); Cheng, H. et al. Green conversion of crop residues into porous carbons and their application to efficiently remove polycyclic aromatic hydrocarbons from water: Sorption kinetics, isotherms and mechanism. *Bioresour. Technol.* 284, 1-8 (2019); Kumar, J. A. et al. Enhanced PAHs removal using pyrolysis-assisted potassium hydroxide induced palm shell activated carbon: Batch and column investigation. *J. Mol. Liq.* 279, 77-87 (2019); Eeshwarasinghe, D., Loganathan, P. & Vigneswaran, S. Simultaneous removal of polycyclic aromatic hydrocarbons and heavy metals from water using granular activated carbon. *Chemosphere* 223, 616-627 (2019), each incorporated herein by reference in their entirety. They have been synthesized and chemically activated using different approaches. See Rodenas, M., Amoros, D. & Solano, A. Understanding chemical reactions between carbons and NaOH and KOH An insight into the chemical activation mechanism. *Carbon N. Y.* 41, 267-275 (2003); Deng, H., Yang, L., Tao, G. & Dai, J. Preparation and characterization of activated carbon from cotton stalk by microwave assisted chemical activation-Application in methylene blue adsorption from aqueous solution. *J. Hazard. Mater.* 166, 1514-1521 (2009); Romanos, J. et al. Nanospace engineering of KOH activated carbon. *Nanotechnology* 23, (2012); and Saleh, T. A. & Danmaliki, G. I. Influence of acidic and basic treatments of activated carbon derived from waste rubber tires on adsorptive desulfurization of thiophenes. *J. Taiwan Inst. Chem. Eng.* 60, 460-468 (2016), each incorporated herein by reference in their entirety.

Recently, few studies have reported the synthesis of porous AC from asphalt material with the high surface area for carbon dioxide uptake. See Jalilov, A. S. et al. Asphalt-derived high surface area activated porous carbons for carbon dioxide capture. *ACS Appl. Mater. Interfaces* 7, 1376-1382 (2015); and Jalilov, A. S., Li, Y., Tian, J. & Tour, J. M. Ultra-High Surface Area Activated Porous Asphalt for $CO_2$ Capture through Competitive Adsorption at High Pressures. *Adv. Energy Mater.* 7, 1-7 (2017), each incorporated herein by reference in their entirety.

However, asphalt products contribute significantly to a release of PAHs in the environment, and the studies that have reported the health risk due to exposure to this PAHs among asphalt workers, See Su, J., Gao, P., Laux, S. J., Ma, L. Q. & Townsend, T. G. Contribution of Asphalt Products to Total and Bioaccessible Polycyclic Aromatic Hydrocarbons. *Int. J. Environ. Res.* (2019). doi:10.1007/s41742-019-00189-6; Burstyn, I., Randem, B., Lien, J. E., Langård, S. & Kromhout, H. Bitumen, Polycyclic aromatic hydrocarbons and vehicle exhaust: Exposure levels and controls among Norwegian asphalt workers. *Ann. Occup. Hyg.* 46, 79-87 (2002); Burstyn, I. et al. Mortality from obstructive lung diseases and exposure to polycyclic aromatic hydrocarbons among asphalt workers. *Am. J. Epidemiol.* 158, 468-78 (2003); McClean, M. D. et al. Urinary 1-hydroxypyrene and polycyclic aromatic hydrocarbon exposure among asphalt paving workers. *Ann. Occup. Hyg.* 48, 565-578 (2004); and Burstyn, I. et al. Bladder cancer incidence and exposure to polycyclic aromatic hydrocarbons among asphalt pavers. *Occup. Environ. Med.* 64, 520-526 (2007), each incorporated herein by reference in their entirety.

Additionally, hydrocarbons are less soluble in water, and thus very few research studies have investigated the removal of both PAHs and diesel at high concentrations from water samples. Fewer or no research has been reported for the removal of both PAHs and diesel at high concentrations in an aqueous sample using an asphalt derived mesoporous carbon as a sorbent material.

In view of the forgoing, one objective of the present invention is to provide a method for removal of PAHs and diesel at high concentrations from an aqueous sample, using an asphalt-derived mesoporous activated carbon.

BRIEF SUMMARY OF THE INVENTION

According to a first aspect, the present invention relates to a method of removing one or more polyaromatic hydrocarbons from an aqueous solution. The aqueous solution comprises the one or more polyaromatic hydrocarbons, each independently at a concentration of 0.1 mg/L-1 g/L, and comprises diesel fuel at a concentration of 0.1-5 g/L. The method involves a step of mixing the nanoporous carbon material with the aqueous solution, and a concentration of the nanoporous carbon material in the aqueous solution after the mixing is 0.1-5 g/L. The nanoporous carbon material reduces the concentration of the one or more polyaromatic hydrocarbons in the aqueous solution by adsorption.

In one embodiment, the one or more polyaromatic hydrocarbons is at least one selected from the group consisting of naphthalene, 2-methyl-naphthalene, biphenylene, acenaphthene, fluorene, anthracene, phenanthrene, fluoranthene, pyrene, triphenylene, and benz[a]anthracene.

In a further embodiment, the one or more polyaromatic hydrocarbons is naphthalene, 2-methyl-naphthalene, biphenylene, acenaphthene, fluorene, anthracene, phenanthrene, fluoranthene, pyrene, triphenylene, and benz[a]anthracene.

In one embodiment, the nanoporous carbon material has an elemental composition of 80-90 wt % C and 10-20 wt % 0, each relative to a total weight of the nanoporous carbon material.

In a further embodiment, at least 98 wt % of the nanoporous carbon material relative to a total weight is C or O.

In one embodiment, the nanoporous carbon material has a BET surface area in a range of 2,000-2,600 $m^2/g$.

In one embodiment, the nanoporous carbon material has a pore volume in a range of 1.00-1.30 $cm^3/g$.

In one embodiment, the nanoporous carbon material is obtained by contacting a carbonized asphalt with KOH.

In one embodiment, at least 90 wt % of the one or more polyaromatic hydrocarbons, relative to an initial weight of the one or more polyaromatic hydrocarbons, is adsorbed by the nanoporous carbon material in 10 minutes.

In a further embodiment, at least 96 wt % of the one or more polyaromatic hydrocarbons, relative to an initial weight of the one or more polyaromatic hydrocarbons, is adsorbed by the nanoporous carbon material in 10 minutes.

In one embodiment, the nanoporous carbon material adsorbs 10-300 mg of the one or more polyaromatic hydrocarbons per g nanoporous carbon material.

In one embodiment, the nanoporous carbon material reduces the diesel fuel concentration in the aqueous solution by adsorption. The nanoporous carbon material adsorbs 10-1800 mg diesel fuel per g nanoporous carbon material.

In one embodiment, at least 60 wt % of the diesel fuel, relative to an initial weight of the diesel fuel, is adsorbed by the nanoporous carbon material In one embodiment, the aqueous solution further comprises a surfactant at a concentration in a range of 1 mg/L-1 g/L.

In a further embodiment, the surfactant is sodium lauryl sulfate.

In one embodiment, the aqueous solution has a pH in a range of 1-3 or 10-13.

In one embodiment, the aqueous solution further comprises gasoline at a concentration in a range of 0.1-5 g/L.

In one embodiment, the aqueous solution further comprises kerosene at a concentration in a range of 0.1-5 g/L.

In one embodiment, the method further comprises the steps of removing the nanoporous carbon material from the aqueous solution to produce a recovered nanoporous carbon material; mixing the recovered nanoporous carbon material with an acidic solution; drying the acidic solution to produce a cleaned nanoporous carbon material; and reusing the cleaned nanoporous carbon material, which maintains an adsorption capacity for at least 5 purification cycles.

In a further embodiment, the acidic solution comprises one or more inorganic acids at a total concentration of 0.05-0.5 M.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2A is an SEM-EDS elemental composition spectrum.

FIG. 2B is a carbon elemental mapping of the AdMC.

FIG. 2C is an oxygen elemental mapping of the AdMC.

DETAILED DESCRIPTION OF THE EMBODIMENTS

Figure 1A:
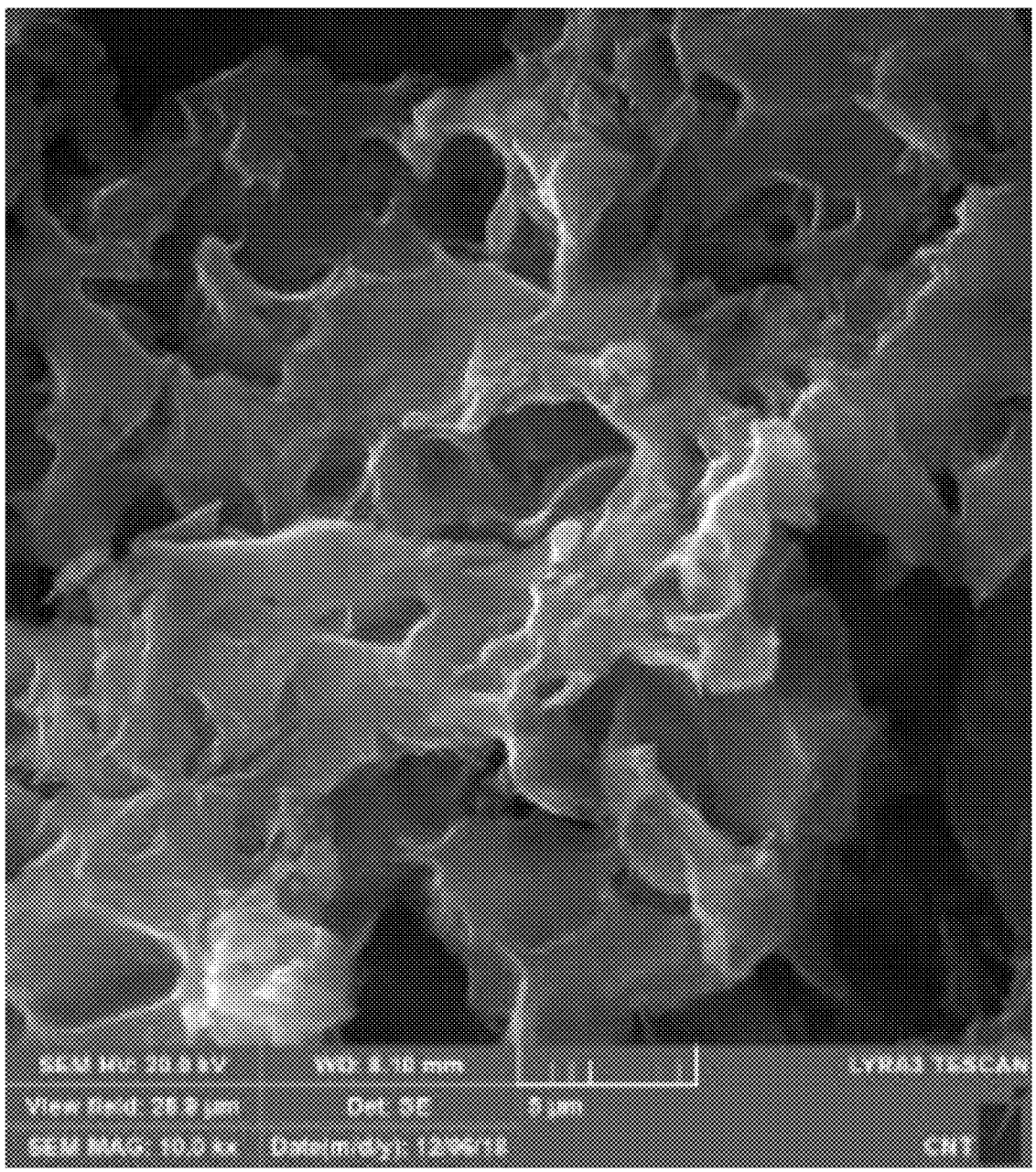
FIG. 1A is an SEM micrograph of the AdMC surface.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Ni(NO_3)_2$ includes anhydrous $Ni(NO_3)_2$, $Ni(NO_3)_2 \cdot 6H_2O$, and any other hydrated forms or mixtures. $CuCl_2$ includes both anhydrous $CuCl_2$ and $CuCl_2 \cdot 2H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present invention relates to a method of removing one or more polycyclic aromatic hydrocarbons (PAH) from an aqueous solution. A polycyclic aromatic hydrocarbon may also be understood by the terms "polyaromatic hydrocarbon" or "polynuclear aromatic hydrocarbon." A polycyclic aromatic hydrocarbon is an uncharged hydrocarbon compound composed of two or more aromatic rings.

In one embodiment, the PAH may have two aromatic rings, such as butalene, azulene, and naphthalene. In one embodiment, the PAH may have three aromatic rings, including but not limited to acenaphthene, acenaphthylene, anthracene, fluorene, phenalene, and phenanthrene. In one embodiment, the PAH may have four aromatic rings, including but not limited to benz[a]anthracene, benzo[a]fluorene, benzo[c]fluorene, benzo[c]phenanthrene, chrysene, fluoranthene, pyrene, tetracene, triphenylene, and tricyclobutabenzene. In one embodiment, the PAH may have five aromatic rings, including but not limited to benz[e]acephenanthrylene, benzopyrene, benzo[a]pyrene, benzo[e]pyrene, benzo[a]fluoranthene, benzo[b]fluoranthene, benzo[j]fluoranthene, benzo[k]fluoranthene, trans-bicalicene, dibenz[a,h]anthracene, dibenz[a,j]anthracene, olympicene, pentacene, perylene, picene, and tetraphenylene. In one embodiment, the PAH may have six or more aromatic rings, including but not limited to anthanthrene, benzo[ghi]perylene, circulene, corannulene, coronene, dicoronylene, diindenoperylene, heptacene, hexacene, kekulene, ovalene, and zethrene.

In one embodiment, the PAH may be 1,10-phenanthroline, 11H-benzo[a]fluorene, 11H-benzo[b]fluorene, 13H-dibenzo[a,i]carbazole, 1H-indole, 1H-phenalene, 2-methyl-naphthalene, 4H-cyclopenta[d,e,f]phenanthrene, 7H-benz[d,e]anthracen-7-one, 7H-benzo[c]fluorene, 7H-dibenzo[a,g]carbazole, 7H-dibenzo[c,g]carbazole, 9(10H)-anthracenone, 9,10-anthracenedione, 9,10-phenanthrenedione, 9H-carbazole, 9H-fluoren-9-one, 9H-fluorene, 9H-xanthene, acenaphthene, acenaphthylene, acephenanthrylene, acridine, anthanthrene, anthracene, anthraquinone, anthrone, azulene, benz[a]anthracene, benz[c]acridine, benz[e]acephenanthrylene, benzanthrone, benzo[a]dibenzothiophene, benzo[a]fluoranthene, benzo[a]fluorene, benzo[a]pyrene, benzo[b]chrysene, benzo[b]fluoranthene, benzo[b]naphtho[2,1-d]thiophene, benzo[b]triphenylene, benzo[c]chrysene, benzo[c]cinnoline, benzo[c]fluorene, benzo[c]phenanthrene, benzo[e]pyrene, benzo[f]quinoline, benzo[g]chrysene, benzo[g,h,i]fluoranthene, benzo[g,h,i]perylene, benzo[h]naphtho[1,2-f]quinolene, benzo[h]quinoline, benzo[j]fluoranthene, benzo[k]fluoranthene, benzo[k]fluoranthene, benzo[r,s,t]pentaphene, benzopyrene, biphenylene, butalene, chrysene, circulene, corannulene, coronene, cyclopenta[c,d]pyrene, dibenz[a,c]anthracene, dibenz[a,h]acridine, dibenz[a,h]anthracene, dibenz[a,h]anthracene, dibenz[a,j]acridine, dibenz[a,j]anthracene, dibenz[c,h]acridine, dibenzo[a,l]pyrene, dibenzo[a,e]pyrene, dibenzo[a,h]pyrene, dibenzo[a,i]pyrene, dibenzo[b,d,e,f]chrysene, dibenzo[b,h]phenanthrene, dibenzo[def,mno]chrysene, dibenzo[def,p]chrysene, dibenzothiophene, dicoronylene, diindenoperylene, fluoranthene, fluorene, heptacene, hexacene, indeno[1,2,3-cd]pyrene, isoquinoline, kekulene, naphthacene, naphthalene, naphtho[1,2,3,4-def]chrysene, naphtho[2,3-f]quinoline, olympicene, ovalene, pentacene, pentaphene, perylene, phenalene, phenanthraquinone, phenanthrene, phenanthridine, phenanthro[4,5-b,c,d]thiophene, phenazine, phenazone, picene, pyrene, quinoline, tetracene, tetraphenylene, trans-bicalicene, tricyclobutabenzene, triphenylene, and/or zethrene.

In one embodiment, the polycyclic aromatic hydrocarbon may be one or more of naphthalene, 2-methyl-naphthalene, biphenylene, acenaphthene, fluorene, anthracene, phenanthrene, fluoranthene, pyrene, triphenylene, benz[a]anthracene, benzo[a]pyrene, chrysene, benzo[b]fluoranthene, benzo[k]fluoranthene, and/or diben[a,h]anthracene.

In a further embodiment, the polycyclic aromatic hydrocarbon consists of 11 compounds, which are naphthalene, 2-methyl-naphthalene, biphenylene, acenaphthene, fluorene, anthracene, phenanthrene, fluoranthene, pyrene, triphenylene, and benz[a]anthracene.

The aqueous solution may comprise the one or more polycyclic aromatic hydrocarbons, each independently at a concentration in a range of 0.1 mg/L-1 g/L, preferably 1-900 mg/L, more preferably 20-800 mg/L, even more preferably 50-700 mg/L, or 100-600 mg/L, or 200-500 mg/L, or 300-400 mg/L, or about 350 mg/L. In another embodiment, a total concentration of the one or more polycyclic aromatic hydrocarbons in the aqueous solution may be in a range of 1 mg/L-4 g/L, preferably 20 mg/L-3 g/L, more preferably 40 mg/L-2 g/L, or 100 mg/L-1 g/L, or 200 mg/L-900 mg/L, or 250 mg/L-850 mg/L.

The method involves a step of mixing a nanoporous carbon material with the aqueous solution, and a concentration of the nanoporous carbon material in the aqueous solution after the mixing is 0.1-5 g/L, preferably 0.2-4 g/L, more preferably 0.3-3 g/L, or 0.3-1 g/L, or about 0.4 g/L. In one embodiment, the concentration of the nanoporous carbon material in the aqueous solution is at least 0.01 g/L, at least 0.05 g/L, at least 0.1 g/L, at least 0.2 g/L, at least 0.3 g/L, or at least 0.4 g/L. In one embodiment, the concentration of the nanoporous carbon material in the aqueous solution is no greater than 5 g/L, no greater than 4 g/L, no greater than 3 g/L, no greater than 2 g/L, no greater than 1 g/L, no greater than 0.9 g/L, no greater than 0.8 g/L, no greater than 0.7 g/L, no greater than 0.6 g/L, no greater than 0.5 g/L, or no greater than 0.4 g/L.

In one embodiment, the nanoporous carbon material may be contacted with the aqueous solution by dispersing or mixing nanoporous carbon material in a fixed volume of aqueous solution, and then stirring or agitating the aqueous solution to keep the nanoporous carbon material evenly mixed throughout. The nanoporous carbon material may be contacted with the aqueous solution for a period of time in a range of 5-60 min, 7-30 min, or 8-15 min, or about 10 min.

In one embodiment, the nanoporous carbon material may not be dispersed or mixed in the aqueous solution but fixed to a solid support, such as a plate or a wire mesh. In one embodiment, the solid support may be planar. The solid support may also be a single piece so that the nanoporous carbon material may be easily removed from the aqueous solution, or removed from a vessel. In a further embodiment, where the nanoporous carbon material is attached to a solid support so that it does not disperse, the aqueous solution may be continually flowed over the nanoporous carbon material. In another related embodiment, the aqueous solution may be intermittently flowed over the nanoporous carbon material. Alternatively, the nanoporous carbon material may be dispersed but confined within a volume of wire mesh. In another embodiment, the nanoporous carbon material may be fixed to a solid support, but dispersed or mixed in the aqueous solution. For example, the nanoporous carbon material may be attached to magnetic microparticles having diameters of 50-800 μm, preferably 100-700 μm.

In one embodiment, the aqueous solution may come from a body of water such as an ocean, a bay, a river, a spring, a lake, a swamp, or a pond or alternatively, from a treated artificial body of water, such as a pool, fountain, bath, aquarium, or hot tub. The sample may also be water taken from other natural environments such as groundwater (such as a well or an aquifer), rainwater, dew, fog, hot spring, a steam vent, snow, ice, or a geyser. In other embodiments, the aqueous solution may come from processed water or wastewater of industrial process including but not limited to a water treatment plant, a sewage treatment plant, a desalination plant, a manufacturing plant, a chemical plant, a textile plant, a power plant, a gas station, a food processing plant (such as milk or fruit juice), a restaurant, a dry cleaner, or some other place that may be a source of contaminated water mixtures. In other embodiments, the aqueous solution may be prepared in a laboratory or pilot plant for the purpose of testing contaminant adsorption.

The aqueous solution comprises water, which in some embodiments may be one or more of tap water, distilled water, bidistilled water, deionized water, deionized distilled water, reverse osmosis water, or some other water. A volume of the aqueous solution may be in a range of 1 mL-10,000 L, preferably 10 mL-100 L, more preferably 25 mL-50 L.

Following the mixing, the nanoporous carbon material reduces the concentration of the one or more polycyclic aromatic hydrocarbons in the aqueous solution by adsorption.

In one embodiment, at least 80 wt %, at least 85 wt %, at least 90 wt %, at least 92 wt %, at least 94 wt %, at least 96 wt %, at least 98 wt % of the one or more polycyclic aromatic hydrocarbons, relative to an initial weight of the one or more polycyclic aromatic hydrocarbons, is adsorbed by the nanoporous carbon material in 10 minutes or less, in 8 minutes or less, or in 5 minutes or less.

Where the nanoporous carbon material adsorbs a certain weight percentage of the one or more polycyclic aromatic hydrocarbons, it is assumed that the concentration of the one or more polycyclic aromatic hydrocarbons decreases by the same amount. For instance, if the nanoporous carbon material adsorbs 96 wt % of the one or more polycyclic aromatic hydrocarbons, relative to an initial weight of the one or more polycyclic aromatic hydrocarbons, it is assumed that the concentration of the one or more polycyclic aromatic hydrocarbons in the aqueous solution is decreased by 96 wt %. The same assumption holds for any other contaminants adsorbed from the aqueous solution.

In one embodiment, the aqueous solution may further comprise a surfactant. In one embodiment, a surfactant may already exist in the aqueous solution as a contaminant. In another embodiment, the method may further comprise a step of adding a surfactant to the aqueous solution. In one embodiment, the surfactant may be an ionic surfactant, a nonionic surfactant, and/or a biological surfactant. "Surfactant" may also be considered synonymous with wetting agent, detergent, emulsifier, foaming agent, and dispersant.

Exemplary ionic surfactants include, but are not limited to, (1) anionic (based on sulfate, sulfonate or carboxylate anions), for example, perfluorooctanoate (PFOA or PFO), perfluorooctanesulfonate (PFOS), sodium dodecyl sulfate (SDS), ammonium lauryl sulfate, and other alkyl sulfate salts, sodium lauryl sulfate (SLS, and also known as sodium laureth sulfate or sodium lauryl ether sulfate (SLES)), alkyl benzene sulfonate, soaps, and fatty acid salts; (2) cationic (based on quaternary ammonium cations), for example, cetyl trimethylammonium bromide (CTAB) (also known as hexadecyl trimethyl ammonium bromide), and other alkyltrimethylammonium salts, cetylpyridinium chloride (CPC), polyethoxylated tallow amine (POEA), benzalkonium chloride (BAC), and benzethonium chloride (BZT); and (3) zwitterionic (amphoteric), for example, dodecyl betaine, cocamidopropyl betaine, and coco ampho glycinate.

Exemplary nonionic surfactants include, but are not limited to, alkyl poly(ethylene oxide), alkylphenol poly(ethylene oxide), copolymers of poly(ethylene oxide) and poly (propylene oxide) (commercially known as Poloxamers or Poloxamines), polyoxyethylene octyl phenyl ether (TRITON X-100®), alkyl polyglucosides, for example, octyl glucoside and decyl maltoside, fatty alcohols, for example, cetyl alcohol and oleyl alcohol, cocamide MEA, cocamide DEA, and polysorbates (commercially known as TWEEN 20®, TWEEN 80®), for example, dodecyl dimethylamine oxide.

Exemplary biological surfactants include, but are not limited to, micellular-forming surfactants or surfactants that form micelles in solution, for example, DNA, vesicles, phospholipids, and combinations thereof.

A surfactant such as those listed above may be present in the aqueous solution at a concentration in a range of 1 mg/L-1 g/L, preferably 10-950 mg/L, more preferably 60-500 mg/L, even more preferably 90-120 mg/L, or about 100 mg/L. In a preferred embodiment, the surfactant is sodium lauryl sulfate (SLS).

In another embodiment, the nanoporous carbon material may be used to adsorb a contaminant from an aqueous solution that is not a PAH, including but not limited to a liquid fuel, a dye, a heavy metal, pharmaceutical compound, a metabolite, a microbial toxin, a surfactant, an herbicide, a pesticide, or a steroid.

In one embodiment, the liquid fuel is kerosene fuel, diesel fuel, gasoline fuel, biodiesel fuel, alcohol fuel, and/or synthetic fuel. Alcohol fuels include, but are not limited to, methanol, ethanol, 1-propanol, isopropanol, n-butanol, isobutanol, tert-butanol, n-pentanol, isoamyl alcohol, and mixtures thereof. Synthetic fuels include, but are not limited to dimethyl ether (DME), fuel produced from processes such as Fischer-Tropsch conversion, methanol to gasoline conversion, or direct coal liquefaction. Preferably the liquid fuel is kerosene fuel, diesel fuel, gasoline fuel, or biodiesel fuel. In one preferred embodiment, the liquid fuel is diesel fuel.

In one embodiment, the aqueous solution, in addition to the one or more PAH, further comprises diesel fuel at a concentration of 0.1-5 g/L, preferably 0.2-3.0 g/L, more preferably 0.8-1.5 g/L, even more preferably about 1 g/L.

In one embodiment, the aqueous solution further comprises gasoline at a concentration in a range of 0.1-5 g/L, preferably 0.2-3.0 g/L, more preferably 0.8-1.5 g/L, even more preferably about 1 g/L.

In one embodiment, the aqueous solution further comprises kerosene at a concentration in a range of 0.1-5 g/L, preferably 0.2-3.0 g/L, more preferably 0.8-1.5 g/L, even more preferably about 1 g/L.

In one embodiment, the aqueous solution consists of only the one or more PAH, a surfactant, and water. In another embodiment, the aqueous solution consists of only the one or more PAH, sodium lauryl sulfate, and water. In another embodiment, the aqueous solution consists of naphthalene, 2-methyl-naphthalene, biphenylene, acenaphthene, fluorene, anthracene, phenanthrene, fluoranthene, pyrene, triphenylene, benz[a]anthracene, sodium lauryl sulfate, and water.

In one embodiment, the aqueous solution consists of only the one or more PAH, a surfactant, diesel fuel, and water. In another embodiment, the aqueous solution consists of only the one or more PAH, sodium lauryl sulfate, diesel fuel, and water. In another embodiment, the aqueous solution consists of naphthalene, 2-methyl-naphthalene, biphenylene, acenaphthene, fluorene, anthracene, phenanthrene, fluoranthene, pyrene, triphenylene, benz[a]anthracene, sodium lauryl sulfate, diesel fuel, and water.

In one embodiment, the nanoporous carbon material may be considered to be mesoporous. A mesoporous material may be defined as having pores with diameters between 2 and 50 nm, however, the nanoporous carbon material may have pores that are larger than 50 nm in some embodiments. The nanoporous carbon material may be called an asphalt derived mesoporous carbon. The nanoporous carbon material may be porous with an average pore diameter in a range of 2-250 nm, preferably 5-200 nm, more preferably 10-150 nm, or 20-100 nm.

The nanoporous carbon material may have an average pore size of smaller than 300 nm, but may still have some number of pores with larger diameters, such as pores of 1-5 μm diameter. Here, the nanoporous carbon material may have a hierarchical porosity or hierarchical pore structure. This means that the nanoporous carbon material has a multi-modal pore size distribution, where the interior of a pore with a large pore size connects with pores having smaller pore sizes.

In one embodiment, the nanoporous carbon material has a pore volume in a range of 1.00-1.30 $cm^3/g$, preferably 1.05-1.28 $cm^3/g$, more preferably 1.10-1.25 $cm^3/g$, even more preferably 1.18-1.23 $cm^3/g$, or about 1.20 $cm^3/g$. In one embodiment, the nanoporous carbon material has a porosity or void fraction of 10-85%, preferably 24-72%, more preferably 36-65%.

In one embodiment, the nanoporous carbon material has a BET surface area in a range of 2,000-2,600 $m^2/g$, preferably 2,100-2,500 $m^2/g$, more preferably 2,200-2,450 $m^2/g$, or about 2,316 $m^2/g$. Here, the surface area may be determined by Brunauer-Emmett-Teller (BET) analysis of $N_2$ adsorption isotherms, though other techniques may be used, such as mercury intrusion porosimetry.

In one embodiment, the nanoporous carbon material has an average particle size of 1-20 μm, preferably 2-10 μm, more preferably 3-6 μm. However, in some embodiments, the average particle size may be smaller than 1 μm or greater than 20 μm. In one embodiment, the nanoporous carbon material has a particle size distribution of 0.5-100 μm, wherein at least 60%, preferably at least 70%, more preferably at least 75% of the particles have a particle size of 1-20 μm. However, in another embodiment, the nanoporous carbon material may have a particle size distribution that is more varied, for instance, the particle sizes may range from 0.2-120 μm, with 40-60% or 50-60% of the particles having a particle size within the range of 1-20 μm. In another embodiment, a narrow particle size distribution may be obtained by selecting the particles for certain sizes, for instance, by filtering or centrifugation. In one embodiment, the nanoporous carbon material may be considered to have one or more shapes similar to spheres, spheroids, ellipsoids, ovoids, flakes, grains, clumps, chips, raisins, or other irregular shapes with curved and/or flat surfaces. In one embodiment, particles of nanoporous carbon material may have a length to width ratio of 1:1-6:1, preferably 1.2:1-5:1, more preferably 1.4:1-4:1. The nanoporous carbon material may have a bulk density of 1.05-1.40 $g/cm^3$, preferably 1.10-1.30 $g/cm^3$, more preferably 1.15-1.25 $g/cm^3$, or about 1.2 $g/cm^3$.

In one embodiment, the particles of nanoporous carbon material may be present as agglomerates. As used herein, the term "agglomerates" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles. The primary particles may be particles of nanoporous carbon material having a mean diameter as the particle sizes previously described.

In one embodiment, the nanoporous carbon material has an elemental composition of 80-90 wt % C, preferably 81-87 wt % C, more preferably 83-86 wt % C and 10-20 wt % O, preferably 12-18 wt % O, more preferably 14-16 wt % O, each relative to a total weight of the nanoporous carbon material.

In a further embodiment, at least 90 wt %, at least 95 wt %, at least 98 wt %, preferably at least 99 wt % of the nanoporous carbon material relative to a total weight is C or O. In a preferred embodiment, 100 wt % of the nanoporous carbon material relative to a total weight is C or O, meaning that the nanoporous carbon material consists of, or consists essentially of Cando.

In one embodiment, the nanoporous carbon material may be obtained by contacting a carbonized asphalt with an inorganic base. Firstly, the carbonized asphalt may be obtained by heating asphalt under a flow of inert gas for 2-6 h, preferably 3-5 h, or about 4 h at a temperature of 440-700° C., 450-650° C., 500-600° C., or about 550° C.

Asphalt, also known as bitumen, is a sticky, black, and highly viscous liquid or semi-solid form of petroleum. Asphalt may be found in natural deposits or may be a by-product of petroleum refining. Asphalt is a colloidal system similar to petroleum, but with lighter molecules removed. Asphalt can be fractionated into 4 major components: saturates, aromatics, resins, and asphaltenes. The fractionated part of saturates and aromatics is considered as gas oil. The polarity of these four fractions can be ordered as: saturates<aromatics<resin<asphaltenes.

Different sources of asphalt have different quantities of saturates, aromatics, resins, and asphaltenes. For example, from western Canadian oils, saturates may be from 8 to 17 wt % relative to the total oil; aromatics may be from 36 to 44 wt % relative to the total oil; resins may be from 18 to 27 wt % relative to the total oil; and asphaltenes may be from 15 to 20 wt % relative to the total oil.

From Arabian oils, saturates may be from 22 to 25 wt % relative to the total oil; aromatics may be from 26 to 50 wt % relative to the total oil; resins may be 10 to 18 wt % relative to the total oil; and asphaltenes may be 30 to 36 wt % relative to the total oil.

From Sumatran oils, saturates from 44 to 46 wt % relative to the total oil, aromatics may be from 30 to 33 wt % relative to the total oil, resins may be from 15 to 17 wt % relative to the total oil, asphaltenes may be from 7 to 10 wt % relative to the total oil. Oils from different regions have different characterizations based on saturates, aromatics, resins, and asphaltenes, and thus the asphaltenes extracted from these sources also have different compositions.

In other embodiments, the composition of asphalt may instead be classified as four main classes of compounds, which are naphthene aromatics, polar aromatics, saturated hydrocarbons, and asphaltenes. Naphthene aromatics include partially hydrogenated polycyclic aromatic compounds and certain substituted aromatic compounds. Polar aromatics include high molecular weight phenols and carboxylic acids. The naphthene aromatics and polar aromatics may be the majority components in some asphalt compositions.

Asphaltenes are a distinct chemical component of asphalt (they are different than asphalt), and impart high viscosity to crude oils, negatively impacting production. In general, asphaltenes are organic compounds which are large, planar, aromatic, contain hetero-atoms, and participate in pi-pi stacking. Two types of structures have been postulated: (a) the "continent" or island structure and (b) the "archipelago" structure. The continent structure (a) represents asphaltene as relatively flat disk shape molecules with a dominantly aromatic core (usually consisting of more than seven rings) and a periphery of aliphatic chains. The archipelago structure (b) contains small aromatic groups (up to four rings) which may be connected to each other by aliphatic chains with carbon numbers up to 24. Asphaltenes can be isolated based on solubility by solvent extraction and other methods. Asphaltenes are insoluble in low-boiling saturated hydrocarbons, such as petroleum naphtha, pentane and hexane, but are soluble in carbon tetrachloride and carbon disulfide. Asphaltenes are usually separated from the solvent in the form of a coarse brown-black powder having essentially no cohesiveness.

The chemical composition of asphaltene varies by source. The asphaltenes employed in the present disclosure may be extracted from Arabian Heavy crude oil, Arabian Medium crude oil, or Arabian Light crude oil. Preferably, the asphaltenes are extracted from Arabian Heavy crude oil. Compared to asphaltenes obtained from other sources, Arabian Heavy asphaltenes have a relatively low gravity (e.g. about 27.9° API), a high sulfur content, and a high paraffinic wax content. Other characteristics of preferred Arabian Heavy asphaltenes used in the present disclosure are discussed below.

Asphaltenes contain varying amounts of oxygen, sulfur, and nitrogen, and generally have a low hydrogen-to-carbon ratio, which indicates a strongly aromatic nature (benzene has a ratio of about 1.0 and naphthalene about 0.8). Preferred asphaltenes employed herein have a hydrogen-to-carbon atomic ratio (as determined by elemental analysis) ranging from 1.1 to 1.2, preferably 1.15 to 1.2, more preferably 1.18 to 1.19. Furthermore, the asphaltenes used in the present composite material typically have an average molecular weight (Mw), determined by gel permeation chromatography, ranging from 1,700 to 2,000 g/mol, preferably 1,750 to 1,900 g/mol, preferably 1,800 to 1,900 g/mol, more preferably 1,850 to 1,875 g/mol, most preferably about 1,866 g/mol.

Preferred asphaltenes comprise carbon atoms in an amount ranging from 80-86 wt. %, preferably 82 to 85 wt. %, more preferably 83 to 84 wt. %, based on a total weight of the asphaltenes. Of the total carbon content, in preferred embodiments, asphaltenes are employed that have 60 to 70 wt. % aliphatic carbon atoms, preferably 62 to 65 wt. %, more preferably 63 to 65 wt. % aliphatic carbon atoms, and 30 to 40 wt. % aromatic carbon atoms, preferably 35 to 38 wt. %, more preferably 35 to 37 wt. %, each based on the total weight of the carbon atoms present in the asphaltenes. That is, the asphaltenes employed herein preferably have a ratio of aliphatic carbon atoms to aromatic carbon atoms of 1.5:1 to 3:1, preferably 1.6:1 to 2:1, preferably 1.7:1 to 1.8:1. In one embodiment, asphaltenes in the source asphalt do not contribute to PAH in the aqueous solution from the nanoporous carbon material.

In one embodiment, the asphalt is a cutback or medium curing asphalt, such as that described in ASTM D2027. In one embodiment, the asphalt is a rapid curing asphalt, such as that described in ASTM D2028. In one embodiment, the asphalt is a slow curing asphalt, such as that described in ASTM D2026. In one embodiment, the asphalt has a kinematic viscosity in a range of 30-60 mm$^2$/s, 60-140 mm$^2$/s, 140-250 mm$^2$/s, 250-500 mm$^2$/s, 500-800 mm$^2$/s, 800-1600 mm$^2$/s, 1600-3000 mm$^2$/s, or 3000-6000 mm$^2$/s, at a temperature in a range of 50-70° C. In one embodiment, the asphalt may be classified as a bitumen grade 40, 50, 60, 70, 85, or 100. In one embodiment, the asphalt is a bitumen grade 60/70. The asphalt may have a penetration at 25° C. mm in a range of 3-6 mm, or 4-5 mm, as measured by ASTM D5. The asphalt may maintain at least 50%, at least 55%, at least 60% of the penetration depth after a thin film oven test, as described in ASTM D1754. The asphalt may have a flash point in a range of 200-260° C., preferably 210-250° C., as measured by ASTM D92. The asphalt may have a ductility in a range of 60-150 cm, preferably 70-120 cm as measured at 25° C. and ASTM D113. The asphalt may have properties in compliance with standards ASTM D946, AASHTO M20, or other standards.

In one embodiment, the asphalt may comprise 80-90 wt %, preferably 82-88 wt %, more preferably 83-85 wt % carbon; 5-15 wt % hydrogen, preferably 7-12 wt % hydrogen, more preferably 8-11 wt % hydrogen; 0.5-18 wt % sulfur, preferably 3-10 wt % sulfur, more preferably 4-8 wt % sulfur; and 0.1-1.0 wt % nitrogen, preferably 0.2-0.8 wt % nitrogen, more preferably 0.3-0.5 wt % nitrogen, each relative to a total weight of the asphalt. The asphalt may comprise less than 0.1 wt %, preferably less than 0.01 wt %, even more preferably less than 0.001 wt % oxygen, relative to a total weight of the asphalt. In one embodiment, the asphalt may be free of oxygen. In one embodiment, the asphalt may comprise 5-100 ppm Ni, 10-50 ppm Ni, or 30-40 ppm Ni. In one embodiment, the asphalt may comprise 5-200 ppm V, 50-150 ppm V, or 80-120 ppm V.

In one embodiment, the asphalt may consist of carbon, hydrogen, sulfur, and nitrogen. In another embodiment, at least 99.9 wt %, at least 99.99 wt % of the asphalt is carbon, hydrogen, sulfur, and nitrogen. In one embodiment, the asphalt may consist of carbon, hydrogen, sulfur, nitrogen, nickel, and vanadium.

In one embodiment, any source of asphalt may be used for producing the nanoporous carbon material. In another embodiment, a specific source of asphalt, such as a source described previously, must be used for producing the nanoporous carbon material having the characteristics and adsorption performance described herein.

In alternative embodiments, a carbonized material may be obtained from asphaltene, coke, rice husk, cotton, corn cob, anthracite, tires, palm shell, coal tar, high carbon fly ash, wood charcoal, and algae.

The carbonized asphalt may be ground and mixed with an inorganic base to produce a powder precursor. The weight ratio between the carbonized asphalt and the inorganic base may be 1:1-1:6, preferably 1:2-1:5, or about 1:4. The inorganic base may be NaOH, KOH, LiOH, $Mg(OH)_2$, $Ca(OH)_2$, $Ba(OH)_2$, $NH_4OH$, or some other inorganic base. Preferably the inorganic base is KOH.

The powder precursor is heated at 750-1,000° C., 800-970° C., 850-950° C., or about 900° C. for 20-45 min to produce a powder product. The powder product is washed with water, methanol, ethanol, isopropanol, and/or acetone and dried to produce the nanoporous carbon material.

In one embodiment, the nanoporous carbon material adsorbs 10-300 mg, preferably 30-250 mg, more preferably 100-200 mg, even more preferably 130-190 mg, or about 166 mg of the one or more polycyclic aromatic hydrocarbons per g nanoporous carbon material. In one embodiment, the nanoporous carbon material adsorbs each of the one or more PAH independently at an amount of 1-300 mg, preferably 2-200 mg, more preferably 3-150 mg per g nanoporous carbon material. In another embodiment, the nanoporous carbon material adsorbs a total amount of the one or more PAH in a range of 50-900 mg, preferably 100-850 mg, more preferably 150-825 mg per g nanoporous carbon material. In one embodiment, the above adsorption amounts occur within a time period of 5-60 min, preferably 8-30 minutes, more preferably 9-15 minutes, or about 10 minutes of mixing the nanoporous carbon material with the aqueous solution. In one embodiment, the amount of a PAH adsorbed may be different compared with other PAHs. In another embodiment, PAH adsorption may be similar between two PAHs regardless of identity.

In one embodiment, the nanoporous carbon material reduces the diesel fuel concentration in the aqueous solution by adsorption, and the nanoporous carbon material adsorbs 10-1,800 mg, preferably 100-1,750 mg, more preferably 500-1,725 mg, even more preferably 1,000-1,700 mg, or about 1,600 mg diesel fuel per g nanoporous carbon material. Where other liquid fuels are present, such as gasoline or kerosene, similar amounts of adsorption may occur. In one embodiment, the above adsorption amounts occur within a time period in a range of 5-60 min, preferably 8-30 minutes, more preferably 9-15 minutes, or about 10 minutes of mixing the nanoporous carbon material with the aqueous solution.

Without being bound by any particular hypothesis, the one or more PAH, diesel fuel, and/or other contaminants may interact with the nanoporous carbon material through $\pi$-$\pi$ electron interactions. This interaction generally takes place between the $\pi$ electron system of the nanoporous carbon material and the PAH or diesel fuel. Additionally, in some embodiments, the nanoporous carbon material may have charged surfaces, allowing electrostatic interactions that may contribute to adsorption of certain contaminants.

In one embodiment, the adsorption of the one or more PAH by the nanoporous carbon material fits well with at least one of Langmuir, Freundlich, and Temkin isotherm models, thereby inferring that the adsorption occurs as a monolayer and as a homogeneous surface adsorption.

In one embodiment, the aqueous solution has a pH in a range of 1-3 or 10-13 or 6-8. In other words, the adsorption amount of compounds per mass of the nanoporous carbon material, and the amount adsorbed after a certain amount of mixing time, is similar at low (pH 1-3) and high pH (pH 10-13) levels. The percent difference between the amount adsorbed at low pH and the amount adsorbed at high pH, assuming otherwise equivalent aqueous solution conditions, may be less than 5%, preferably less than 3%. Here, the "percent difference" of two values refers to the absolute difference between the two values, divided by the average of the two values, all multiplied by 100.

In one embodiment, the method is pH independent, meaning that the adsorption amount or rate is not significantly different across aqueous solutions with a pH within the range of 1-14 but have otherwise equivalent properties (such as concentration and identity of PAH, and mass of nanoporous carbon material added). Here, the adsorption amount or rate being not significantly different across the pH range means that for two or more aqueous solutions in the range, each individual aqueous solution has an adsorption amount or rate with a percent difference compared with the mean of the two or more aqueous solutions that is less than 10%, preferably less than 5%.

In other embodiments, the aqueous solution has a pH of 6-8 or about 7. In other embodiments, the aqueous solution does not have a pH in a range of 6-8, or does not have a pH in a range of 4-9.

In one embodiment, the aqueous solution has a temperature of 20-55° C., preferably 25-50° C., more preferably 30-45° C., even more preferably 32-40° C. In one embodiment, the adsorption of the contaminant is an endothermic process, and thus more of the contaminant is adsorbed at higher temperatures. In an alternative embodiment, the contaminant adsorption may be an exothermic process, which may be more efficient at lower temperatures. In another embodiment, the contaminant adsorption may not be sufficiently influenced by the aqueous solution temperature.

In one embodiment, the method further comprises the steps of removing the nanoporous carbon material from the aqueous solution to produce a recovered nanoporous carbon material; mixing the recovered nanoporous carbon material with an acidic solution; drying the acidic solution to produce a cleaned nanoporous carbon material; and reusing the cleaned nanoporous carbon material, which maintains an adsorption capacity for at least 5 purification cycles.

Preferably in removing the nanoporous carbon material, all of it may be recovered after each purification cycle, enabling multiple cycles to be repeated with a single batch of nanoporous carbon material. However, in some embodiments, 0.1-1 mass %, or 1-5 mass %, may be lost with each cycle. Preferably the reuse of the nanoporous carbon material does not significantly change its morphology or other physical characteristics. The nanoporous carbon material may be removed from the aqueous solution by centrifugation, drying, filtration, and/or decanting. In addition, where the recovered nanoporous carbon material is attached to a magnetic support, a magnet may be used In one embodiment, the recovered nanoporous carbon material may be mixed with the acidic solution at a concentration of 1-30 g/L, preferably 5-25 g/L, more preferably 10-20 g/L, though in some embodiments, the concentration may be less than 1 g/L or greater than 30 g/L. The mixing may involve techniques of agitating or dispersing, as previously mentioned, and in some embodiments, the acidic solution may be cooled or heated. Alternatively, the recovered nanoporous carbon material and acidic solution may first be mixed, and then left to sit without agitation.

In a further embodiment, the acidic solution comprises one or more inorganic acids at a total concentration of 0.05-0.5 M, preferably 0.07-0.4 M, more preferably 0.1-0.3 M. However, in some embodiments, the acidic solution may comprise organic acids, such as acetic acid, or may comprise one or more inorganic acids at a total concentration of less than 0.05 M or greater than 0.5 M. In one embodiment, the inorganic acid may be nitric acid, hydrochloric acid, hydrofluoric acid, sulfuric acid, phosphoric acid, hydrobromic acid, boric acid, perchloric acid, hydroiodic acid, or some other inorganic acid or mineral acid. Preferably the inorganic acid is sulfuric acid, hydrochloric acid, or a mixture of both. Where two inorganic acids are used, the inorganic acids may be present in the acidic solution at a mol ratio of 1:10-10:1, preferably 1:5-5:1, more preferably 1:2-2:1.

In one embodiment, mixing the recovered nanoporous carbon material with the acidic solution enables desorption of the contaminant from the recovered nanoporous carbon material into the acidic solution. In one embodiment, 20-50 wt %, preferably 25-45 wt %, more preferably 27-40 wt % of the adsorbed contaminant, relative to the initial weight of the adsorbed contaminant, releases from the recovered nanoporous carbon material and becomes free in the acidic solution after 10-40 minutes, more preferably after 15-35 minutes of mixing. In another embodiment, 60-100 wt %, preferably 65-95 wt %, more preferably 70-90 wt % of the adsorbed contaminant, relative to the initial weight of the adsorbed contaminant, releases from the recovered nanoporous carbon material and becomes free in the acidic solution after 60-180 minutes, more preferably after 70-120 minutes of mixing. In some embodiments, depending on the type of contaminant, the acidic solution may react with the adsorbed contaminant. In one embodiment, the recovered nanoporous carbon material is in contact with the acidic solution for 30-60 min, 1-2 h, 2-6 h, or 12-24 h. In another embodiment, the recovered nanoporous carbon material may be stored indefinitely in the acidic solution until it is needed for reuse.

The recovered nanoporous carbon material is removed from the acidic solution to produce a cleaned nanoporous carbon material. Preferably the recovered nanoporous carbon material is removed from the acidic solution in any means similar to those previously mentioned for removing the nanoporous carbon material from the aqueous solution. In addition, where the recovered nanoporous carbon material is attached to a magnetic support, a magnet may be used. In another embodiment, a base may be added to the acidic solution to neutralize the solution before removing the nanoporous carbon material. Preferably the cleaned nanoporous carbon material is rinsed, washed, and/or dried in a manner similar to that described for producing the nanoporous carbon material.

In an alternative embodiment, the nanoporous carbon material may be fixed to a support and exposed to a flowing contaminant solution, where the nanoporous carbon material then adsorbs a contaminant. The used nanoporous carbon material may then be cleaned in place and optionally dried while staying fixed to the support. Alternatively, the nanoporous carbon material may not be fixed to a support, but confined within a permeable membrane or filter, allowing similar operation.

Following the drying, the cleaned nanoporous carbon material may be reused to adsorb the same one or more PAH and/or diesel, or a different contaminant from an aqueous solution. In one embodiment, the cleaned nanoporous carbon material maintains its adsorption capacity for at least 5 purification cycles. Here, "maintains adsorption capacity" means that the ratio of the maximum adsorbed contaminant mass per mass of cleaned nanoporous carbon material is at least 70%, preferably at least 80%, more preferably at least 90% of its initial value. A purification cycle refers to the adsorption of a contaminant by the cleaned nanoporous carbon material and the subsequent cleaning of the nanoporous carbon material to remove a portion or all of the contaminant. Preferably the cleaned nanoporous carbon material is able to maintain its adsorption capacity across different contaminants. In other embodiments, the cleaned nanoporous carbon material is able to maintain its adsorption capacity for at least 10 cycles, at least 20 cycles, at least 30 cycles, or even at least 50 cycles.

In one embodiment, a recovered nanoporous carbon material is able to maintain its adsorption capacity without cleaning, for instance, if the recovered nanoporous carbon material had been previously mixed with low concentrations of a contaminant.

The examples below are intended to further illustrate protocols for preparing, characterizing the nanoporous carbon material, and uses thereof, and are not intended to limit the scope of the claims.

EXAMPLE 1

Materials and Methods
Synthesis of Asphalt Derived Mesoporous Carbon

Porous carbon was prepared by carbonization of mixtures of asphalt and potassium hydroxide (KOH) at elevated temperatures under nitrogen atmosphere. The asphalt used in this study was collected from the Ras Tanura refinery of Saudi Aramco, Saudi Arabia. The Ras Tanura refinery is located in the Eastern Province of Saudi Arabia and provides asphalt for local and Gulf consumption. Arabian light crude oil is used to produce 2000 to 3000 tons of 60/70 grade asphalt per day using the air blowing technique. Table 1 shows the elemental analysis of the asphalt used, and Table 2 shows the metal concentration of the asphalt.

TABLE 1

Elemental Analysis (wt %) of Ras Tanura Asphalt

| Sample | C | H | S | N | O | H/C | O/C ($\times 10^{-3}$) | S/C ($\times 10^{-2}$) | N/C ($\times 10^{-3}$) |
|---|---|---|---|---|---|---|---|---|---|
| RT - F | 84.66 | 10.41 | 4.58 | 0.39 | Nil | 1.46 | Nil | 2.03 | 3.96 |

TABLE 2

Metals Concentration (ppm) of Ras Tanura Asphalt

| Sample ID | Ni | V | V/Ni |
|---|---|---|---|
| RT-F | 33 | 114 | 3.45 |

Initially, solid asphalt was heated above the melting point and then poured into a quartz boat and inserted into an OTF-1200x-UL tube-furnace. The tube was sealed from both sides, and the flow of nitrogen gas was controlled. The temperature was maintained at 550° C. for 4 hrs. The nitrogen gas was passed through the tube to maintain an oxygen/air-free atmosphere in the tube while the heat treatment continued. The material obtained was ground and mixed with KOH in a clean mortar at a 1:4 ratio of carbonaceous material to KOH. The mixture was further heated in a quartz tube furnace at 900° C. for 30 mins and was allowed to cool to room temperature. Subsequently, the product was washed several times with deionized water and acetone until its pH becomes neutral and dried in an oven at 150° C. for 2 hrs. The final product obtained is a fine dark powder and is referred to as Asphalt Derived Mesoporous Carbon (AdMC).

EXAMPLE 2

Characterization of Mesoporous Material

Characterization of the synthesized AdMC was performed using different techniques. The surface morphology was characterized by a Lyra3® (TESCAN, Czech Republic) Field Emission Scanning Electron Microscope with energy dispersive X-ray spectrometer for the determination of the elemental composition. The functional groups of the synthesized AdMC were identified by a Fourier Transform Infrared (FT-IR) spectrometer (Nicolet® 6700 FT-IR, USA). TGA was used to conduct the thermal stability while the X-ray diffraction analysis was performed using Rigaku Miniflex II® desktop X-ray diffractometer (30 kV, 200 mA). The diffractometer produces Cu-Kα radiation, while data were collected at angles between 20 and 80° C. at a scan rate of 4° C./min. For the Brunauer-Emmett-Teller (BET) surface area measurements, 0.2 g of AdMC in BET glass tube at 200° C. for two hours in vacuum. Nitrogen adsorption isotherms were obtained by ASAP® 2010 analyzer (Micromeritics, Norcross, Ga., USA) with the BET equation and density functional theory method.

EXAMPLE 3

Preparation of Water-Emulsion Samples

To prepare diesel stock solution: 5 g of gasoline and 0.5 g sodium lauryl sulfate surfactant were added to 5 L of tap water, and the solution was stirred for 1 h to obtain a homogenized diesel stock solution. For the PAHs mixture, 350 mg/L concentration was prepared with appropriate SLS amount. The sample pH adjustment was performed using 1 M HCl and 1 M NaOH solutions. All the working solutions containing different concentrations of hydrocarbons with different pH have been prepared by diluting the above stock solutions.

EXAMPLE 4

Analysis of PAHs and Diesel

To evaluate the removal capability of individual PAHs from the spiked aqueous sample, after the batch process, the remaining samples were extracted using modified United States Environmental Protecting Agency method-625, and then the extract was analyzed by gas chromatography/mass spectrometry. For the diesel removal studies, total organic carbon composition was evaluated (without extraction) by analyzing the sample with a total organic carbon analyzer.

10 mL of PAHs spiked aqueous sample was transferred to a 50 mL glass centrifuge tube followed by 1 mL of methylene chloride solvent. The solvent containing sample was shaken for 20 min with test tube Orbi-Shaker (Thermo Scientific, USA). The top layer was discarded and a sufficient amount of anhydrous sodium sulfate was added to remove the water content. The methylene chloride solvent was transferred to a 2 mL vial, and then the extract was analyzed using GC-MS for quantitation. Control experiments were performed before and after the adsorption process to calculate the recovery.

In order to separate and quantify the PAHs, GC-MS (QP2010 Shimadzu, Kyoto, Japan) was utilized. The GC-MS system comprises an autosampler (Shimadzu AOC-20s) and a column (Rxi-5 Sil MS) for the separation of PAHs with 0.25 µm width, 30.0 m length, and 0.25 mm diameter (Restek, PA, USA). Highly pure helium gas (99.999%) with a flow rate of 1.00 mL/min was used as the carrier gas. The temperature of the GC injection port was kept at 180° C., whereas the GC-MS interface temperature was held at 220° C. For the ion source, 200° C. was adjusted. The temperature programming of the GC oven was done as follows: the initial temperature of 40° C. was increased to 180° C. at a rate of 10° C./min and held for 4 min; then it was further increased to 210° C. at a rate of 2° C./min and kept for another 4 min; and finally, it was increased to 231° C. at a rate of 3° C./min. The qualitative and quantitative analysis was done in scan mode with a split ratio of 1:10.

Total organic carbon (TOC) analyzer (Shimadzu, TOC-LCSH E 200 ROHS) was used to measure the total hydrocarbon amount initially and after removal. Initially, a five-point calibration was constructed using potassium hydrogen phthalate aqueous solution (standard calibration) and by calculating the concentration of hydrocarbon in the diesel emulsified solution with control and with that remaining after adsorption by the sorbent.

EXAMPLE 5

Batch Adsorption Study

To investigate the adsorption capacity of PAHs at high concentrations, solutions of 350 mg/L of the 11 PAH compounds in an emulsified water-diesel mixture were prepared. A 5000 mL-emulsion was obtained by mixing 5 g of gasoline, 0.5 sodium lauryl sulfate (SLS) surfactant, the required volume of PAHs in THF, and deionized water. The mixture homogenization was achieved by stirring at 1000 rpm for 1 h. All adsorption studies were conducted using a batch equilibration technique at 25° C. The effect of solution pH, amount of adsorbent, initial concentration of PAHs, and contact time were investigated. PAH conditions were evaluated with low concentration spiked samples, followed by liquid-liquid extraction and GC/MS analyses. However, the adsorption capacity of PAHs and diesel samples were analyzed using the TOC analyzer without any sample preparation.

EXAMPLE 6

Result and Discussion
Characterization of AdMC

The microstructural level details for the synthesized activated along with elemental composition were obtained by SEM-EDS.

Figure 1B:
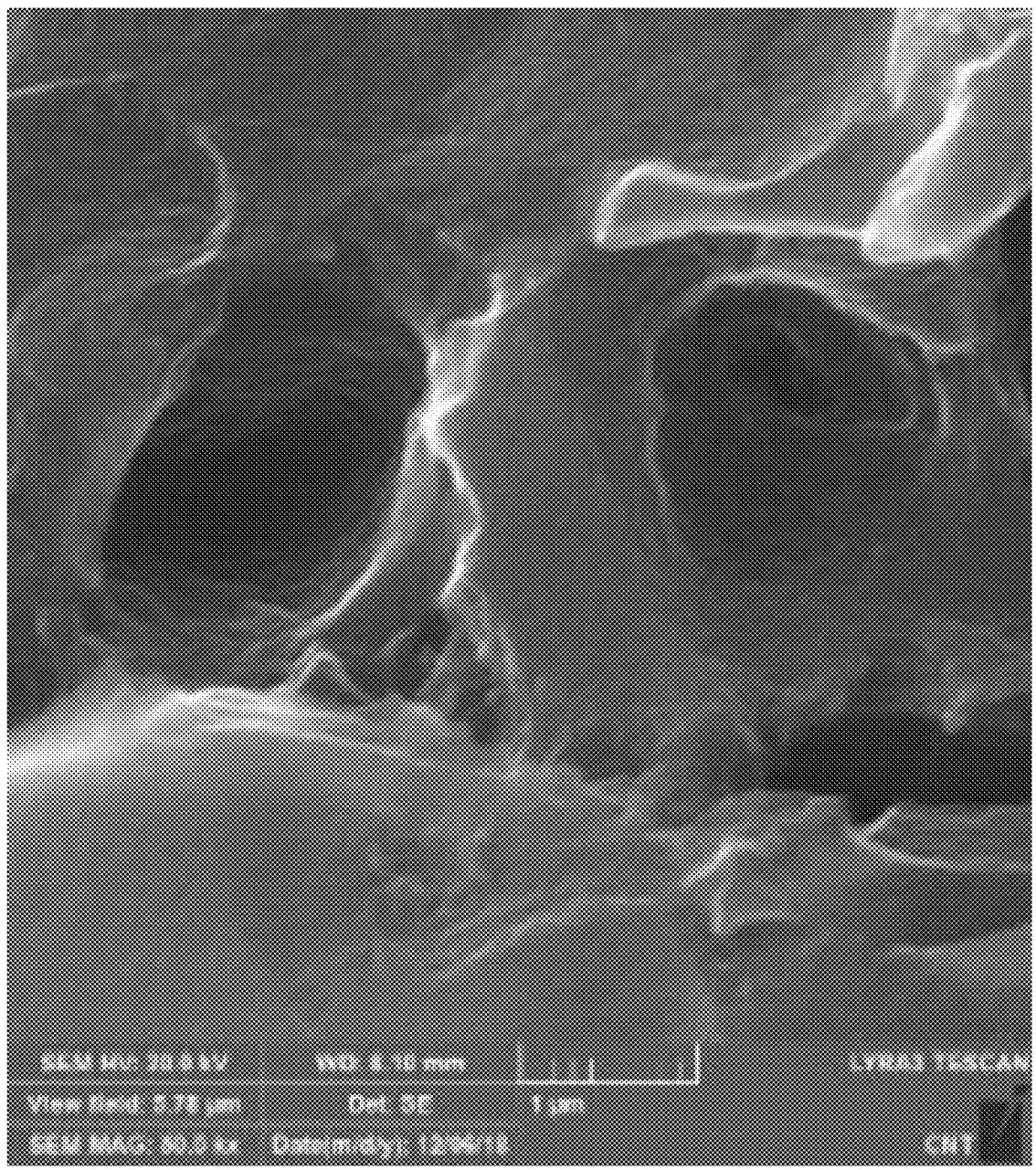
FIG. 1B is another SEM micrograph of the AdMC surface.

The SEM micrographs, FIGS. 1A and 1B, of the mesoporous carbon surface show an irregular surface morphology with cavities and pores. The activated carbon also contains sharp edges and interconnected pores. The EDS spectrum for elemental composition, FIG. 2A, showed that AdMC is made up of mainly carbon and oxygen. This result was confirmed by the elemental mapping of the surface, as seen in FIGS. 2B and 2C.

Figure 3:
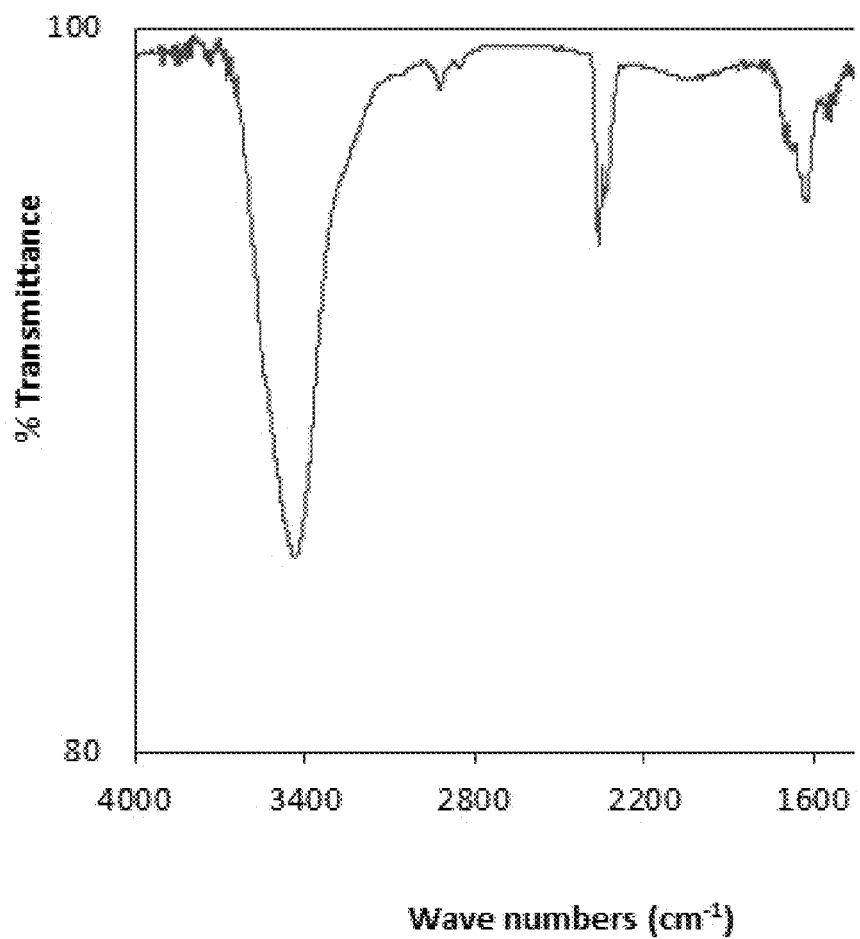
FIG. 3 is an FT-IR spectrum of the AdMC.

FT-IR analysis was conducted to identify the functional groups present in the AdMC. The absorbance bands observed in FIG. 3 have been reported in the literature for Activated carbon derived from various sources. The bands around 3430 $cm^{-1}$ and 1630 $cm^{-1}$ are assigned to the O—H stretching and bending modes of hydroxyl groups, respectively. See Saleh, T. A., Gupta, V. K. & Al-Saadi, A. A. Adsorption of lead ions from aqueous solution using porous carbon derived from rubber tires: Experimental and computational study. *J. Colloid Interface Sci.* 396, 264-269 (2013); and Romanos et al., each incorporated herein by reference in their entirety. The band at 2360 $cm^{-1}$ is attributed to C—C stretching mode of the alkyne group while the one near 1100 $cm^{-1}$ is due to the C—O group. See Deng et al.

The BET surface area and porosity were determined using $N_2$ sorption/desorption at 77 K. The sample was heated for degassing before the experiment and left to cool at room temperature under vacuum. AdMC exhibits a very high surface area of about 2316 $m^3/g$, which is much higher when compared to any other activated carbon materials derived from various sources, except for the ones derived from asphalt materials as shown in Table 3. These results make asphalt the best choice to produce extremely efficient activated carbon for adsorptive removal of PAHs and pave the way to use such adsorbents for removal of other pollutants. However, the asphalt-derived activated carbon with the ultra-high surface area was evaluated for carbon dioxide uptake and not studied for liquid-phase adsorption. See Jalilov et al. (2015) and Jalilov et al. (2017). Moreover, chemical activation of the carbon with KOH resulted in higher surface area and pore volume compared to the activation using acids, $KHCO_3$, or $ZnCl_2$, as shown in Table 3.

TABLE 3

Comparison of surface area and pore volume for activated carbon derived from different sources and some commercial activated carbons

| Source of activated carbon | Activation Reagent | BET surface area ($m^2/g$) | Pore volume ($cm^3/g$) | Reference |
| --- | --- | --- | --- | --- |
| Commercial | — | 1218 | 0.53 | Eeshwarasinghe et al. (2018) |
| Petroleum Coke | KOH | 1904 | 0.94 | Yuan et al. |
| Enteromorpha Prolifera | HCl/HF | 205.3 | — | Qio et al. |
| Corn Cob | $KHCO_3$ | 1281 | 0.72 | Cheng et al. (2019) |
| Commercial | — | 1010 | 0.69 | Eeshwarasinghe et al. (2019) |
| Anthracite | NaOH/KOH | 1234-2193 | — | Rodenas et al. |
| Cotton Stalk | $ZnCl_2$ | 794.8 | 0.63 | Deng et al. |
| Corncob Waste | KOH | 1000 | 0.78 | Romanos et al. |
| Rubber Tires | NaOH | 369 | 0.69 | Saleh et al. (2016) |
| Asphalt | KOH | 2860 | 1.43 | Jalilov et al. (2015) |
| Asphalt | KOH | 4200 | 2.41 | Jalilov et al. (2017) |
| Palm Shell | KOH | 430 | 0.72 | Cheng et al. (2019) |
| Rubber Tyres | $HNO_3$ | 493 | 0.77 | Saleh, T. A. et al. *Process Saf. Environ. Prot.* 102, 9-19 (2016) |
| Asphalt | KOH | 2316 | 1.2 | Current study |

EXAMPLE 7

Batch Adsorption of PAHs from Water

In these experiments, 50 mL of the aqueous solution containing 1 ppm from each of the 11 PAHs was used to study the effect of pH, amount of the adsorbent, and the contact time. The remaining amount of each of the 11 PAHs was quantified by GC-MS in order to investigate the difference in the adsorption behavior between all PAHs under study. For the rest of the study, TOC analyzer was employed to determine the amount of all analytes together. The percentage removal was calculated from the following formula:

$$\% \text{ Removal} = \frac{C_0 - C_e}{C_0} \times 100$$

Where $C_0$ (mg/L) and $C_e$ (mg/L) are the initial and equilibrium concentration of each PAH, respectively.

EXAMPLE 8

Effect of Solution pH

To study the effect of the solution pH, 50 mL aqueous solutions containing 1 mg/L of each of the PAH under study were adjusted to the following pH; 1, 4, 10, and 13 in separate flasks. Each solution was stirred with 20 mg of the AdMC for 30 min. The adsorption of PAHs by AdMC was proven to be pH-independent since no significant difference in the % removal for almost all compounds. High uptake was observed for most of the compounds and to a lesser extent for 2-methylnaphthalene and anthracene. However, the lowest adsorption efficiency obtained was not less than 95%. These pH results are expected since PAHs have no functional groups to be affected by changing the solution pH. In addition, the activated carbon surface is not sensitive to by pH variation. Then, the rest of the study was carried out at the normal pH of water.

EXAMPLE 9

Amount of Adsorbent

Figure 4A:
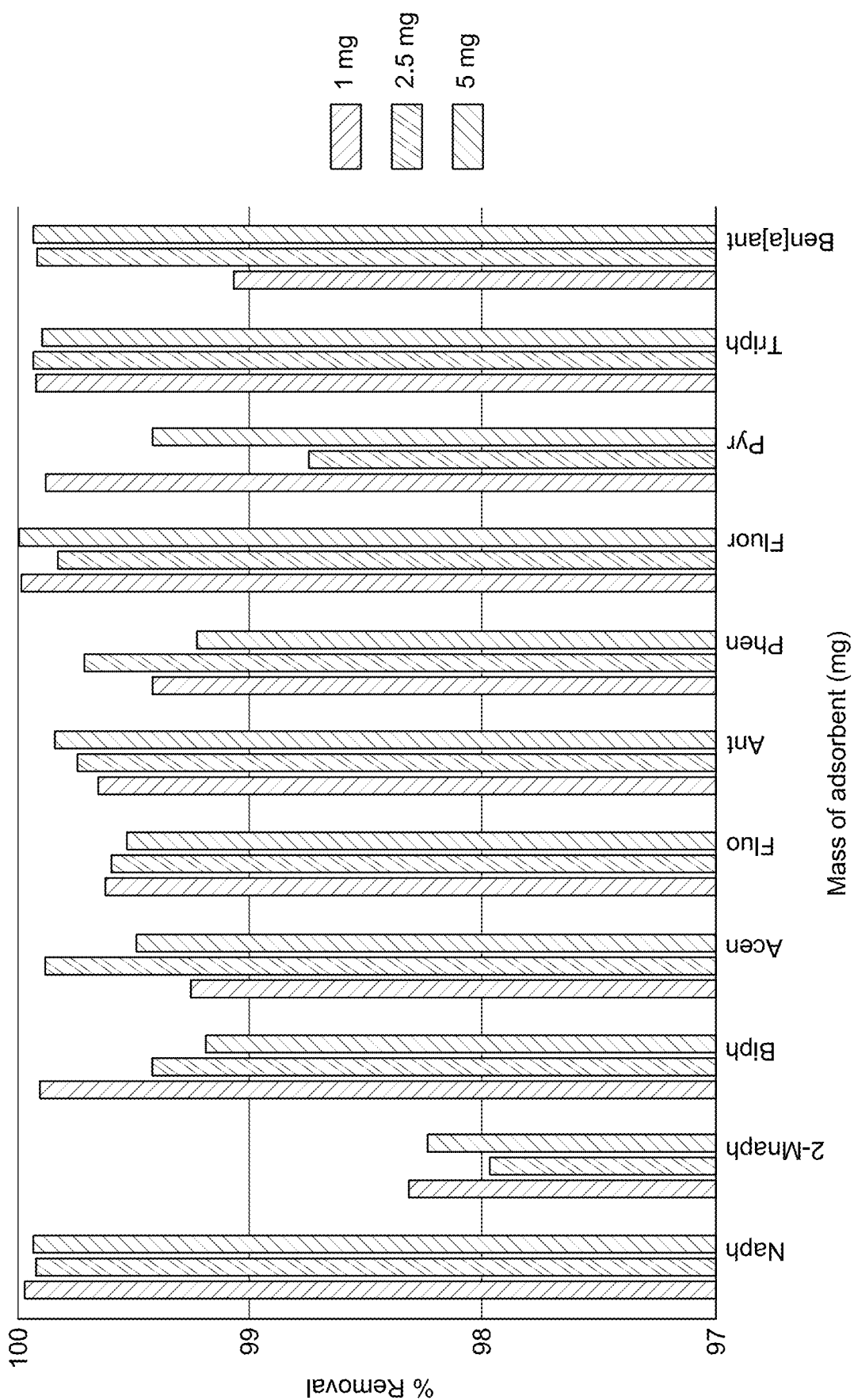
FIG. 4A shows the effect of adsorbent dosage on the % removal of PAHs.

The adsorbent was evaluated by varying the amount used to remove PAHs from 50 mL of a mixture of PAHs, the concentration of each is 1 mg/L, within 30 min. FIG. 4A shows that the percent removal of PAHs is almost the same using different amounts of AdMC (1, 2.5, or 5 mg), which indicates the extreme uptake of PAHs by the minimal amount of this efficient adsorbent material. Although some compounds were adsorbed to a lesser extent than the others, which is normal behavior due to the molecule size and structure, the lowest % removal was around 98%. No significant enhancement in the adsorption process was noticed with increasing the amount of the sorbent from 1-5 mg, which indicates the high adsorption capacity of the AdMC.

EXAMPLE 10

Effect of Contact Time

Figure 4B:
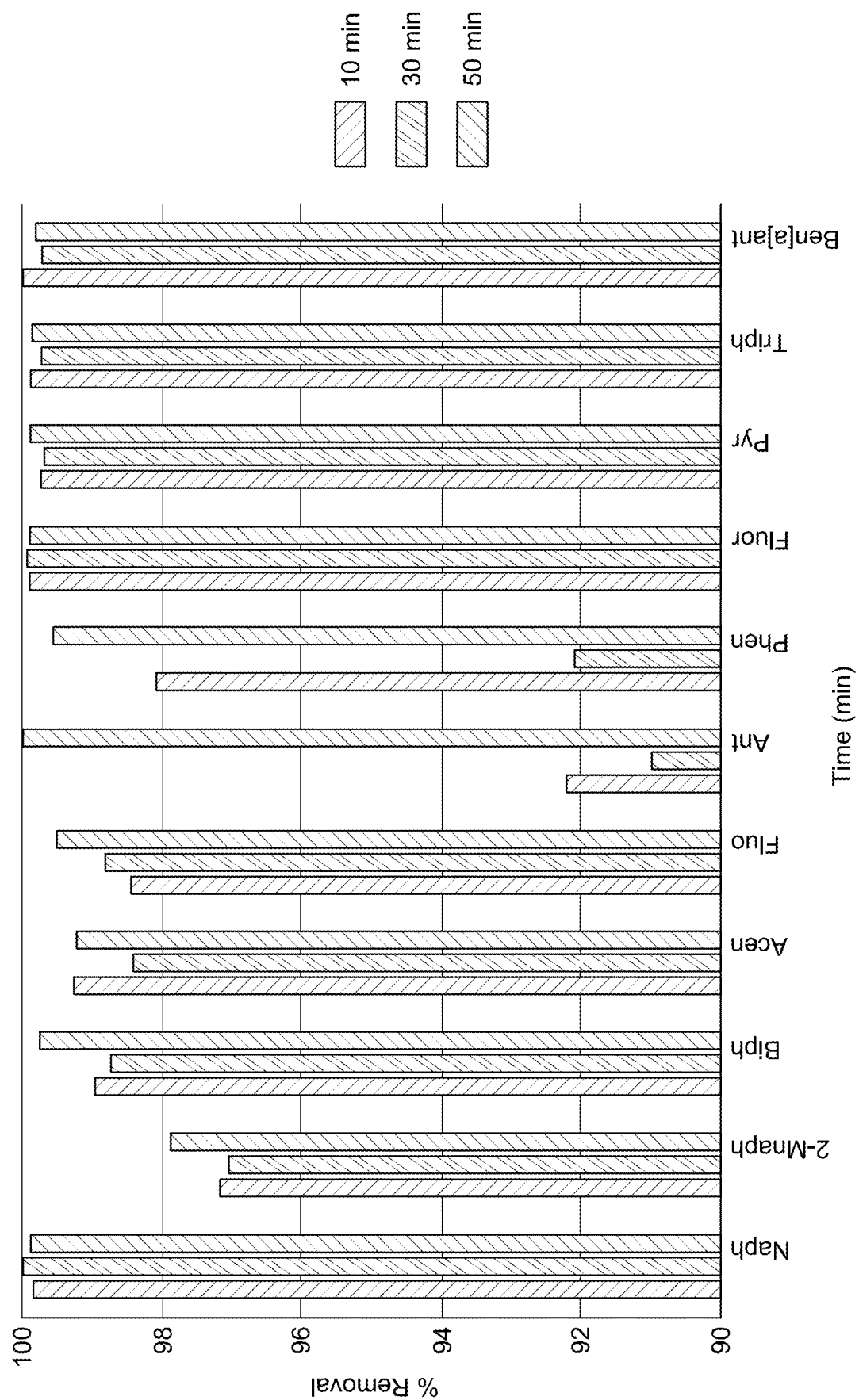
FIG. 4B shows the effect of contact time on the % removal of PAHs.

The adsorption process was evaluated at three different contact times; 10, 30, and 50 min, using 1 mg of the sorbent in 50 mL solution containing 1 mg/L of each PAH. This experiment showed an extremely fast adsorption process by which ≥98% of most of the compounds was adsorbed during the first 10 minutes, as shown in FIG. 4B.

EXAMPLE 11

Adsorption Isotherms

Figure 5A:
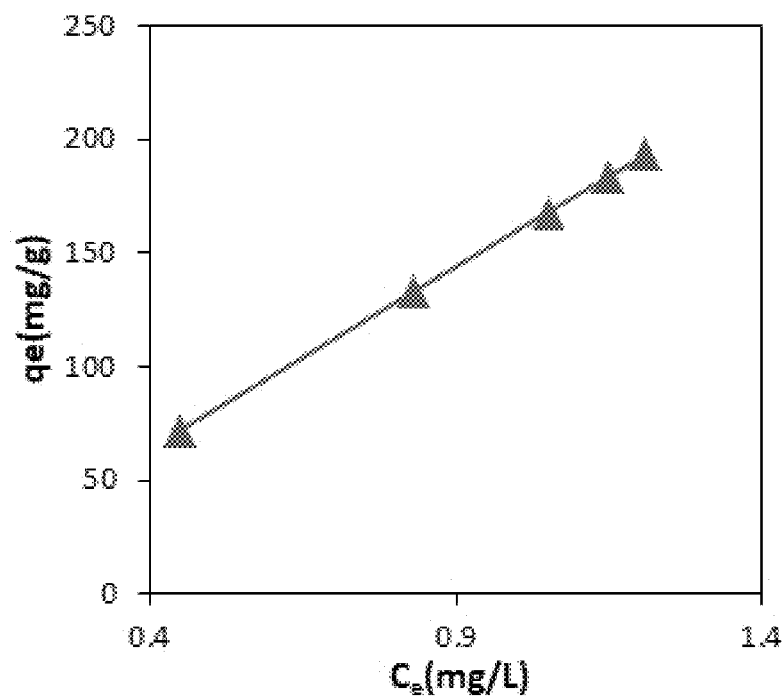
FIG. 5A shows the adsorption isotherm for the adsorption of PAHs on AdMC from aqueous emulsion solutions.
Figure 5B:
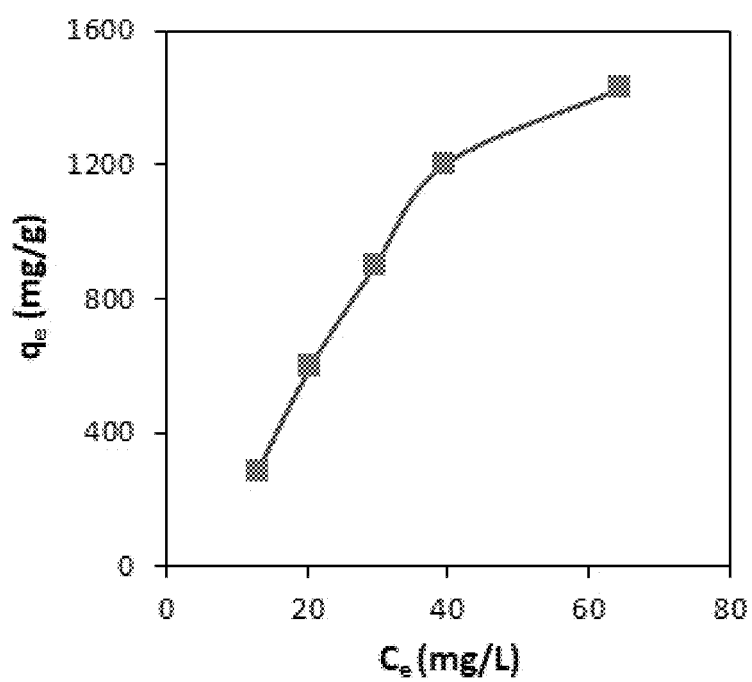
FIG. 5B shows the adsorption isotherm for the adsorption of PAHs on AdMC from water-diesel emulsions.
Figure 5C:
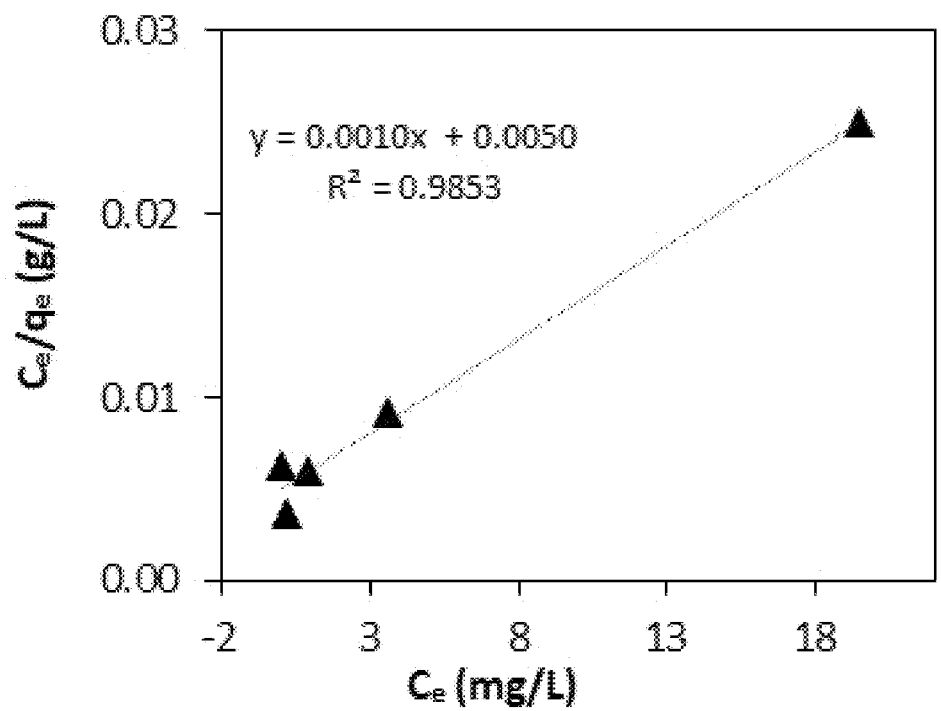
FIG. 5C shows the Langmuir adsorption model for PAHs in aqueous emulsion solution adsorbed on AdMC.
Figure 5D:
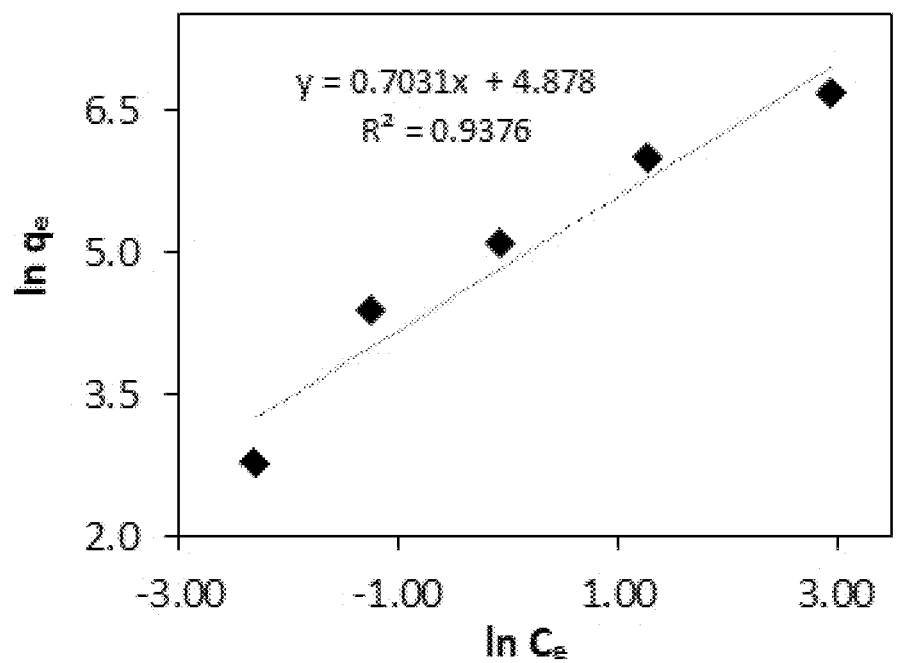
FIG. 5D shows the Freundlich adsorption model for PAHs in aqueous emulsion solution adsorbed on AdMC.

The adsorption isotherms of the PAHs adsorbed from 50 mL emulsion solution of different initial concentrations in the aqueous phase and from water-diesel emulsion are presented in FIGS. 5A and 5B, respectively. These figures showed a characteristic L-type isotherm curve (Langmuir), where at lower concentrations, the adsorption capacity increases significantly with the initial concentrations, but the increase of adsorption capacity is smaller at higher concentration as the vacant sites on the adsorbent surface are filled. It can be explained that at lower concentrations, the existence of strong affinity for the PAHs by the numerous vacate sites on the AdMC surface leads to the high adsorption capacities noticed. The reduction in adsorption capacity at high concentration could be due to the saturation of the adsorption sites, which is followed by a decrease in affinity for the remaining PAHs or in the water-diesel emulsion phases. To further gain more insight into the adsorption behavior of PAHs on the surface of AdMC, the adsorption isotherm data were fitted to the conventional isotherm models; namely, the Langmuir model provided in equation (A) and the linear relation of the Freundlich model described in equation (B):

$$\frac{C_e}{q_e} = \frac{1}{q_m} C_e + \frac{1}{K_L q_m} \quad (A)$$

$$\ln q_e = \frac{1}{n} \ln C_e + \ln K_F. \quad (B)$$

In these equations, $q_e$ is the amount (mg/g) of PAHs absorbed per unit mass at the equilibrium concentration $C_e$ (mg/L); $q_m$ is the maximum quantity of PAHs adsorbed per unit mass of adsorbent (mg/g); $K_L$ is Langmuir constant (L/mg) related to the adsorption energy; $K_F$ is Freundlich constant $$(\text{mg}/\text{g})(\text{L/mg})^{\frac{1}{n}};$$

and n is another Freundlich constant. Analytical parameters provided in Table 4 show that the adsorption of PAHs fits more with the Langmuir model than with the Freundlich model based on its high $R^2$ values (0.9853), and thus provides an indication of monolayer physisorption of PAHs on the surface of AdMC. The obtained Langmuir maximum adsorption capacity of 1000 mg/g was found to deviate fairly from the experimental maximum adsorption capacity value of 1600 mg/g. Using the obtained Langmuir constant parameter ($K_L$=0.2 L/mg), a dimensionless parameter $R_L$, known as the separation factor that denotes the favorable or unfavorable nature of the adsorption process, was calculated using the expression:

$$R_L = \frac{1}{(1 + C_m K_L)},$$

where $C_m$ is the maximum initial concentration. An $R_L$ value in the range 0-1 indicates a favorable adsorption process. The calculated $R_L$ value of 0.2 further proved the favorable monolayer physisorption of the PAHs in the AdMC surface. It is worth noting that other investigators have reported similar conclusions for PAHs adsorption onto other types of adsorbent materials. See Carla B. Vidal, Allen L. Barros, Cicero P. Moura, Ari C. A. de Lima, Francisco S. Dias, Luiz. C. G. Vasconcellos, Pierre B. A. Fechineb, Ronaldo F. Nascimento, Adsorption of polycyclic aromatic hydrocarbons from aqueous solutions by modified periodic mesoporous organosilica. *J. Colloid Interface Sci.* 357, 466-473 (2011); and Sun, Y., Yang, S., Zhao, G., Wang, Q., Wang, X., Adsorption of polycyclic aromatic hydrocarbons on graphene oxides and reduced graphene oxides. Chem. Asian J. 8, 2755-2761 (2013), each incorporated herein by reference in their entirety.

TABLE 4

Analytical Parameters of Langmuir and Freundlich Models

| Isotherm model | Parameter | $R^2$ |
|---|---|---|
| Langmuir | $q_m$(mg/g) = 1000<br>$K_L$(L/mg) = 0.20 | 0.9853 |
| Freundlich | n = 1.42<br>$K_F\left[(mg/g)(L/mg)^{\frac{1}{n}}\right] = 131.4$ | 0.9376 |

EXAMPLE 12

Adsorption Kinetics

An adsorption kinetic study was carried out to determine the potential rate-limiting step, and possibly the mechanism involved in the uptake of each of the individual PAHs by the produced activated carbon. See José Arnaldo Santana Costa, Roberta Anjos de Jesus, Caio Marcio Paranhos da Silva, Luciane Pimenta Cruz Romão, Efficient adsorption of a mixture of polycyclic aromatic hydrocarbons (PAHs) by Si-MCM-41 mesoporous molecular sieve. Powder Technology 308, 434-441 (2017), incorporated herein by reference in its entirety. Accordingly, the conventional adsorption kinetic models, namely, Pseudo first order and second-order rate models provided in equations C and D were fitted to the experimental data, and the kinetic parameters were estimated. Linear regression approach was used with a coefficient of variation ($R^2$) as the error term, and was employed in fitting the rate models to the experimental data.

$$\ln(q_e - q_t) = \ln q_e - k_1 t \quad (C)$$

$$\frac{t}{q_t} = \frac{1}{k_2 q_e^2} + \frac{t}{q_e} \quad (D)$$

In Equations C and D, ($q_e$) is the theoretical equilibrium adsorption capacity (mg/g) of each of the PAHs derived from the model's plot; ($q_t$) represents the adsorption capacity (mg/g) at any of the chosen time (t) derived from the experimental data; $k_1$ represents the pseudo-first-order rate constant (min$^{-1}$), which was calculated from the intercept of a plot of $\ln(q_e-q_t)$ against t (time) and $k_2$, and on the other hand, represents the pseudo-second-order rate constant (g/mg min), and its value was derived from the slope and intercept of $$\frac{t}{q_t}$$

against t.

Figure 6A:
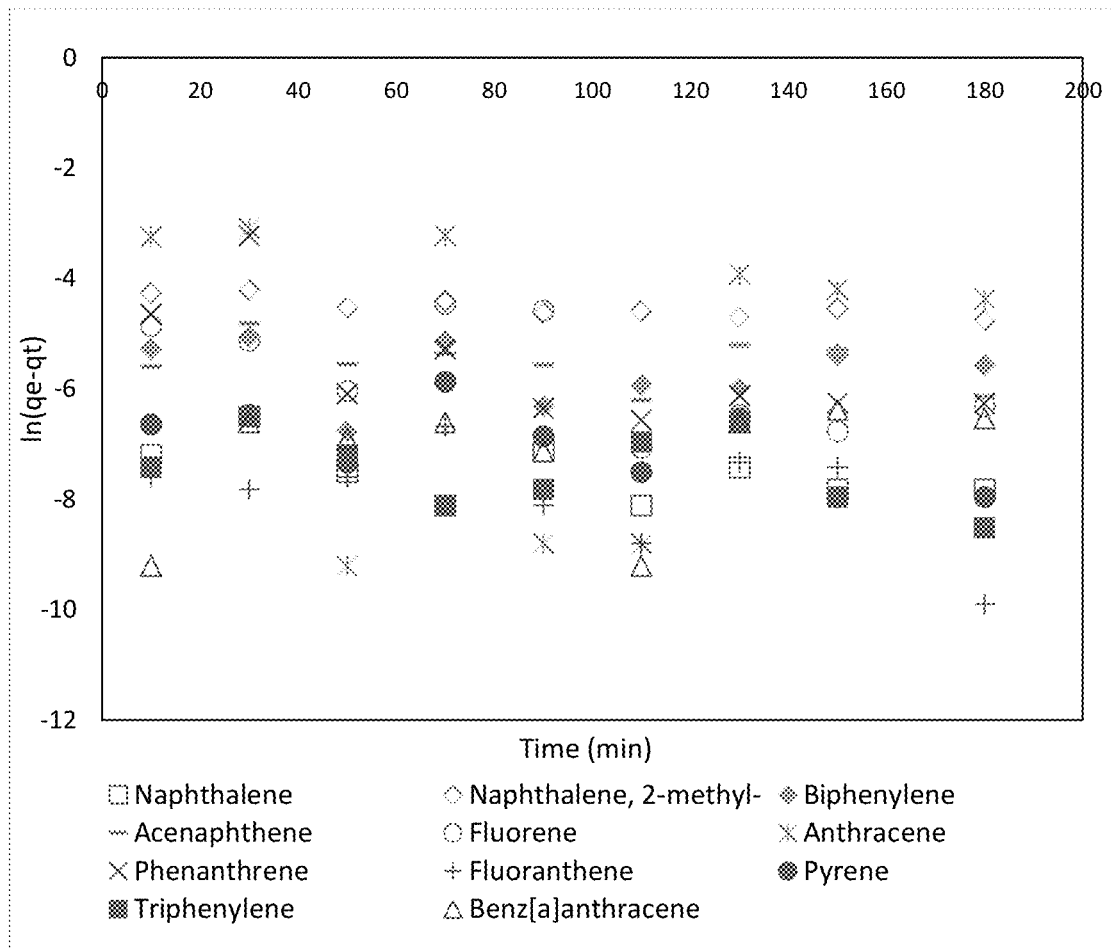
FIG. 6A shows a plot of the pseudo-first order adsorption kinetic model.
Figure 6B:
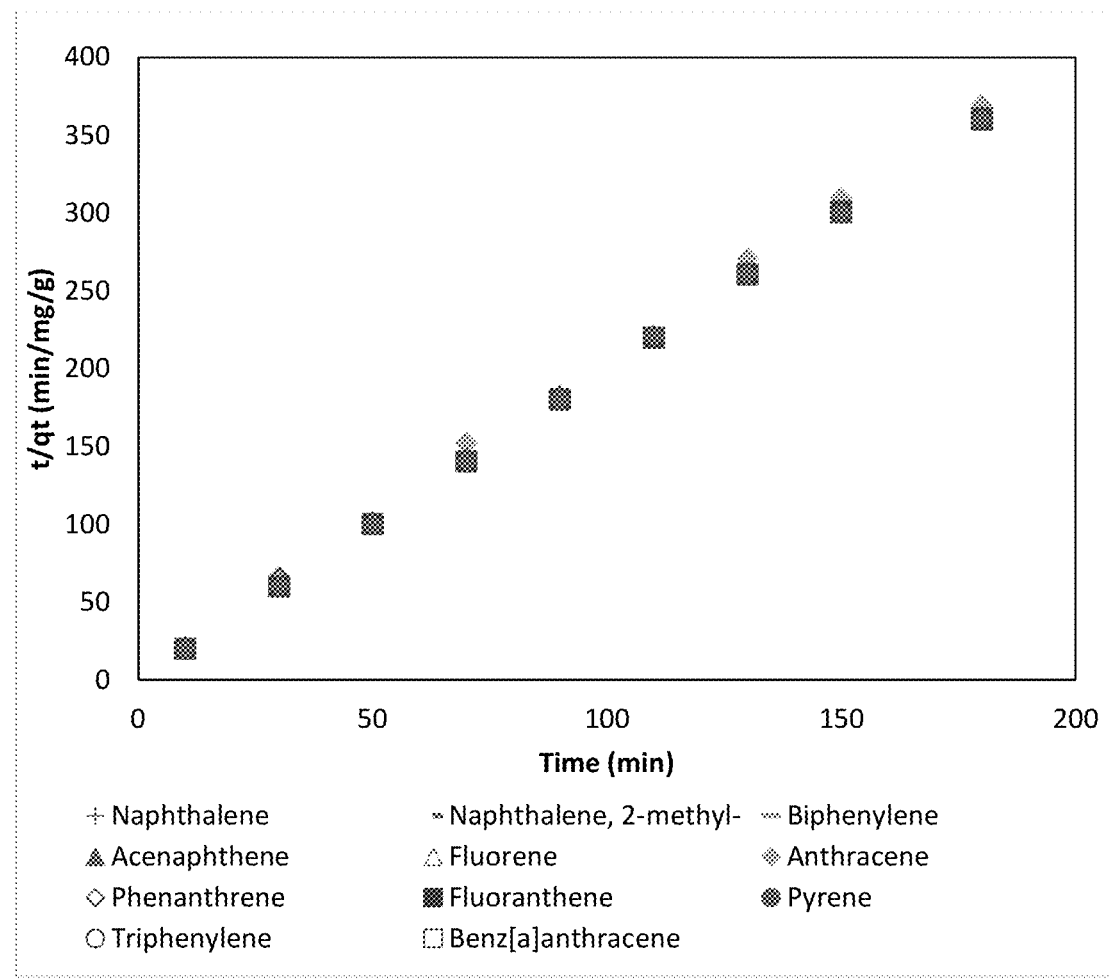
FIG. 6B shows a plot of the pseudo-second order adsorption kinetic model.

The results of the models fitting presented in FIGS. 6A and 6B, together with the obtained kinetic parameters in Table 5 show that the linear pseudo-second-order model offers the best description of the experimental data based on it higher $R^2$ values for each of the PAHs. On the contrary, the linear pseudo-first-order model offered a poor description of the data as it presented lower $R^2$ values (<0.72) for each of the PAHs. Since the second-order model gave the best description of the experimental data, it can thus be concluded that the uptake of the PAHs by the AdMC might have taken place via chemical interaction with the hydrophobic groups of the AdMC surface.

TABLE 5

Adsorption kinetic parameters

| | Components | | | | | |
|---|---|---|---|---|---|---|
| | First Order | | | Second Order | | |
| Kinetic Parameters | k1 (min$^{-1}$) | qe (mg/g) | $R^2$ | k2 (g/mg-min) | qe (mg/g) | $R^2$ |
| Naphthalene | 2.00E−08 | 166.2013 | 0.3057 | 63.1700 | 0.4997 | 1.0000 |
| Naphthalene, 2-methyl- | 2.00E−07 | 166.2180 | 0.7012 | 6.7929 | 0.4915 | 1.0000 |
| Biphenylene | 5.00E−08 | 166.2013 | 0.0687 | 93.7500 | 0.4969 | 1.0000 |
| Acenaphthene | 7.00E−08 | 166.2013 | 0.1468 | 12.1830 | 0.4970 | 1.0000 |
| Fluorene | 2.00E−07 | 166.2013 | 0.4161 | 3.3640 | 0.4997 | 0.9999 |
| Anthracene | 9.00E−07 | 166.2346 | 0.0015 | 2.3250 | 0.4902 | 0.9985 |
| Phenanthrene | 7.00E−07 | 166.2180 | 0.4851 | 2.0890 | 0.5014 | 0.9998 |
| K Fluoranthene | 1.00E−08 | 166.2013 | 0.2461 | 51.4800 | 0.4978 | 1.0000 |
| Pyrene | 4.00E−08 | 166.2013 | 0.3954 | 17.8800 | 0.4997 | 1.0000 |
| Triphenylene | 2.00E−08 | 166.2013 | 0.1942 | 44.9100 | 0.4996 | 1.0000 |
| Benz[a]anthracene | 3.00E−08 | 166.2013 | 0.1430 | 36.7800 | 0.4985 | 1.0000 |

EXAMPLE 12

Batch Adsorption of PAHs and Water-Diesel Mixture

In order to test the adsorption capacity of the AdMC, high concentrations of PAHs and diesel in the range 70-350 mg/L were prepared as an emulsion. The emulsion was obtained with of sodium lauryl sulfate as a surfactant. The adsorption behavior using different amounts of sorbent and different concentrations of PAHs was studied for 10 min. It was noticed from the adsorption isotherm in FIG. 5B that the adsorption of PAHs on AdMC was increasing with the increase of the initial concentration. This result was explained by the total coverage of the adsorbent surface, within 10 min, due to two factors: the high concentration of PAHs and the extreme adsorption of the synthesized AdMC. It can be concluded that this superior adsorbent has the ability to remove a high concentration of PAHs from homogeneous emulsions after only 10 min. The Langmuir adsorption capacity values for some adsorbents are listed in Table 6. It was noticed that some adsorbents had achieved adsorption capacity higher than the current study. However, none of those studies has investigated the adsorptive removal of more than 3 PAHs compounds at the same time, while this work evaluated the simultaneous adsorption of 11 PAHs, including those of higher molecular structures.

The synthesis of microporous carbon from asphalt with a higher surface area was demonstrated and characterized for the removal of high concentration polyaromatic hydrocarbons and diesel samples from homogenized aqueous samples. The result obtained shows that sample pH is not affected by the removal efficiency of hydrocarbons. The results were evaluated using both Langmuir and Freundlich adsorption isotherms. The experimental data show a higher correlation value when fitted to Langmuir adsorption isotherm compared to other isotherms considered. The results were also fitted to pseudo second order and intraparticle diffusion kinetic models. The adsorption capacity of the sorbent is higher for diesel compared with previously reported materials in the literature. Since the removal efficiency for hydrocarbons was close to quantitative capacity in a short contact time, the sorbent can be used to remove a wide range of organic pollutants in environmental samples.

This work reports the syntheses of an inexpensive and efficient asphalt derived mesoporous carbon (AdMC) as an adsorbent. The adsorbent was activated with potassium hydroxide to increase its surface area and then characterized by SEM-EDS, FT-IR, and BET. The adsorption properties of AdMC were evaluated for the adsorptive removal of eleven Poly Aromatic Hydrocarbons (PAHs) and diesel from water samples. The prepared AdMC showed very high surface areas and high micropore volumes equal to 2316 $m^2/g$ and 1.2 $cm^3/g$, respectively. Various experimental conditions influencing the adsorption capacity of eleven PAHs and diesel were investigated. At high concentrations, the PAH and diesel solubility in water is very low. Hence, samples were emulsified with a surfactant, and then maximum adsorption capacity was investigated. Adsorption profile of AdMC for individual PAHs was evaluated after liquid-liquid extraction followed by gas chromatography/mass spectrometry analysis. Total hydrocarbon removal was studied using total organic analyzer. Asphalt derived mesoporous sorbent showed an effective ability to remove PAHs and diesel (average adsorption capacity of 166 mg/g for individual PAHs and diesel (maximum capacity of 1600 mg/g). The experimental results fitted the Langmuir model with a correlation efficiency of 0.9853. The results obtained for both adsorbents also fitted to pseudo-second-order kinetics, suggesting that the adsorption of PAHs and diesel is physical, monolayer producing, and homogeneous.

The invention claimed is:

1. A method of removing one or more polycyclic aromatic hydrocarbons from an aqueous solution, comprising:
   mixing a nanoporous carbon material with the aqueous solution,
   wherein the aqueous solution comprises:
      the one or more polycyclic aromatic hydrocarbons, each independently at a concentration of 0.1 mg/L 1 g/L,
      a surfactant at a concentration in a range of 1 mg/L 1 g/L; and
      diesel fuel at a concentration of 0.1-5 g/L,
   wherein a concentration of the nanoporous carbon material in the aqueous solution after the mixing is 0.1-5 g/L, and
   wherein the nanoporous carbon material reduces the concentration of the one or more polycyclic aromatic hydrocarbons in the aqueous solution by adsorption.

2. The method of claim 1, wherein the one or more polycyclic aromatic hydrocarbons is at least one selected from the group consisting of naphthalene, 2-methyl-naphthalene, biphenylene, acenaphthene, fluorene, anthracene, phenanthrene, fluoranthene, pyrene, triphenylene, and benz[a]anthracene.

3. The method of claim 1, wherein the one or more polycyclic aromatic hydrocarbons consists of naphthalene, 2-methyl-naphthalene, biphenylene, acenaphthene, fluorene, anthracene, phenanthrene, fluoranthene, pyrene, triphenylene, and benz[a]anthracene.

4. The method of claim 1, wherein the nanoporous carbon material has an elemental composition of 80-90 wt % C and 10-20 wt % O, each relative to a total weight of the nanoporous carbon material.

5. The method of claim 4, wherein at least 98 wt % of the nanoporous carbon material relative to a total weight is C or O.

6. The method of claim 1, wherein the nanoporous carbon material has a BET surface area in a range of 2,000-2,600 $m^2/g$.

7. The method of claim 1, wherein the nanoporous carbon material has a pore volume in a range of 1.00-1.30 $cm^3/g$.

8. The method of claim 1, wherein the nanoporous carbon material is obtained by contacting a carbonized asphalt with KOH.

9. The method of claim 1, wherein at least 90 wt % of the one or more polycyclic aromatic hydrocarbons, relative to an

TABLE 6

The PAHs and Diesel maximum adsorption capacity of some adsorbents

| Type of adsorbent | PAHs analyzed | BET surface area ($m^2/g$) | Pore volume ($cm^3/g$) | Maximum adsorption (mg//g) | Reference |
|---|---|---|---|---|---|
| Reduced graphene oxide-hybridized polymer | Naph, Flu, Phen, Ant, Fluor, Pyr, Ben[a]Pyr, Chr, Ben[b]fluor, Ben[k]fluor, diben[a,h]ant | 10.7 | — | 47.5 | (a) |
| Petroleum coke | Naph, Pyr, Fluo, and Phen | 1904 | 0.94 | — | (b) |
| Corn cob | Naph, Acen, and Phen | 1281 | 0.72 | 593-692 | (c) |
| Activated carbon derived from palm shell | PAHs | 430 | 0.72 | 131.7 | (d) |
| MOF-derived carbons | Naph, Pyr, Ant | 1906 | 0.99 | 62-310 | (e) |
| Asphalt | Naph, 2-MNaph, Biph, Acen, Fluo, Ant, Phen, Fluor, Pyr, Triph, Ben[a]ant | 2316 | 1.2 | 166.7 | This study |
| | Diesel in an aqueous sample | | | 1600 | |

Naph = Naphthalene, 2-MNaph = 2-methyl-Naphthalene, Biph = Biphenylene, Acen = Acenaphthene, Fluo = Fluorene, Ant = Anthracene, Phen = Phenanthrene, Fluor = Fluoranthene, Pyr = Pyrene, Triph = Triphenylene, Ben[a]ant = Benz[a]anthracene Ben[a]Pyr = Benzo[a]pyrene, Chr = chrysene, Ben[b]fluor = Benzo[b]fluoranthene, Ben[k]fluor = Benzo[k]fluoranthene, diben[a,h]ant = diben[a,h]anthracene
Table References: (a) Huang et al.; (b) Yuan et al.; (c) Cheng et al. (2019); (d) Cheng, H. et al. *Bioresour. Technol.* 284, 1-8 (2019); and (e) Bhadra et al., each incorporated herein by reference in their entirety.

initial weight of the one or more polycyclic aromatic hydrocarbons, is adsorbed by the nanoporous carbon material in 10 minutes.

10. The method of claim 9, wherein at least 96 wt % of the one or more polycyclic aromatic hydrocarbons, relative to an initial weight of the one or more polycyclic aromatic hydrocarbons, is adsorbed by the nanoporous carbon material in 10 minutes.

11. The method of claim 1, wherein the nanoporous carbon material adsorbs 10-300 mg of the one or more polycyclic aromatic hydrocarbons per g nanoporous carbon material.

12. The method of claim 1, wherein the nanoporous carbon material reduces the diesel fuel concentration in the aqueous solution by adsorption, and
wherein the nanoporous carbon material adsorbs 10-1,800 mg diesel fuel per g nanoporous carbon material.

13. The method of claim 1, wherein at least 60 wt % of the diesel fuel, relative to an initial weight of the diesel fuel, is adsorbed by the nanoporous carbon material.

14. The method of claim 1, wherein the surfactant is sodium lauryl sulfate.

15. The method of claim 1, wherein the aqueous solution has a pH in a range of 1-3 or 10-13.

16. The method of claim 1, wherein the aqueous solution further comprises gasoline at a concentration in a range of 0.1-5 g/L.

17. The method of claim 1, wherein the aqueous solution further comprises kerosene at a concentration in a range of 0.1-5 g/L.

18. The method of claim 1, further comprising:
removing the nanoporous carbon material from the aqueous solution to produce a recovered nanoporous carbon material;
mixing the recovered nanoporous carbon material with an acidic solution;
drying the acidic solution to produce a cleaned nanoporous carbon material; and
reusing the cleaned nanoporous carbon material, which maintains an adsorption capacity for at least 5 purification cycles.

19. The method of claim 18, wherein the acidic solution comprises one or more inorganic acids at a total concentration of 0.05-0.5 M.

* * * * *